Feb. 13, 1962

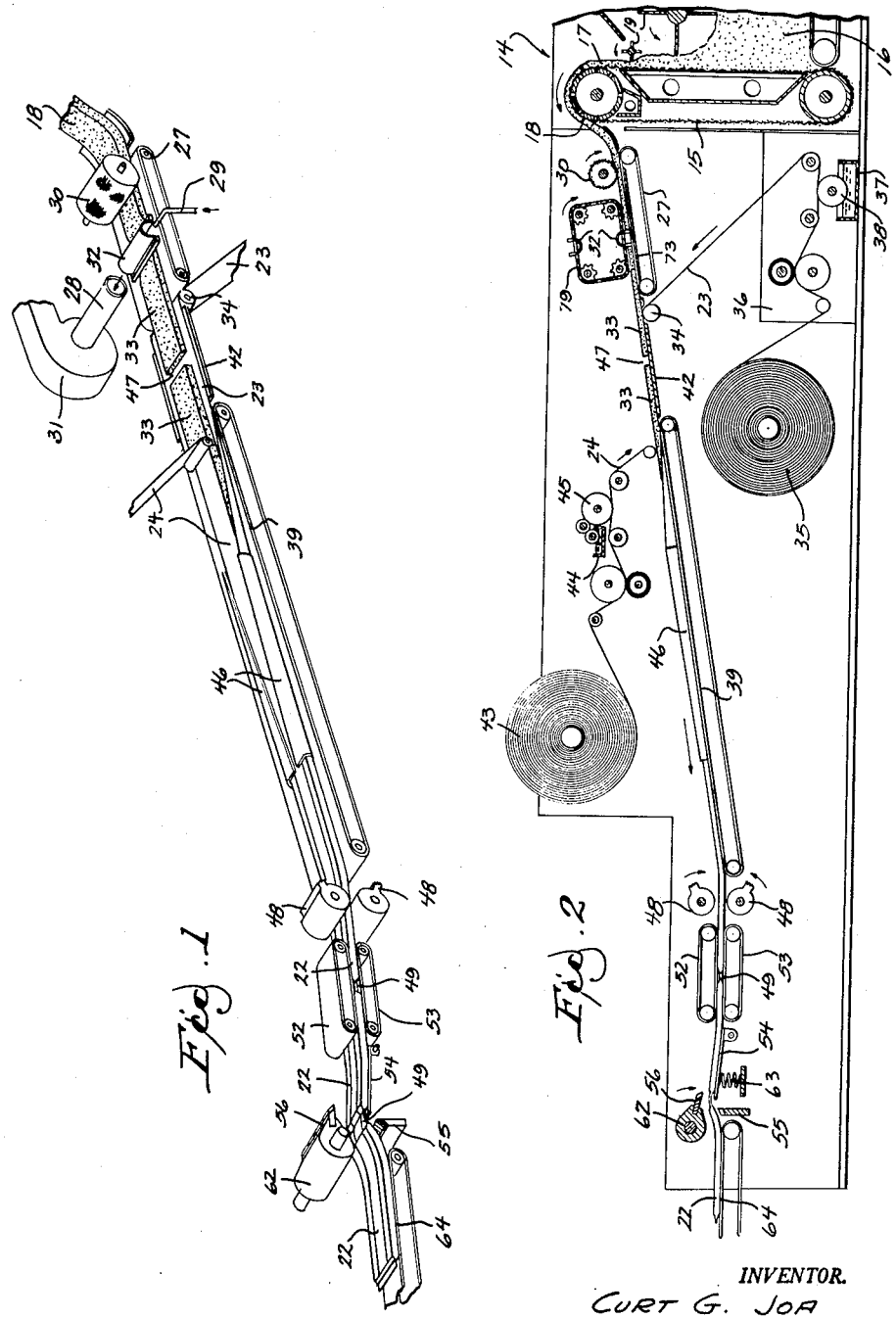

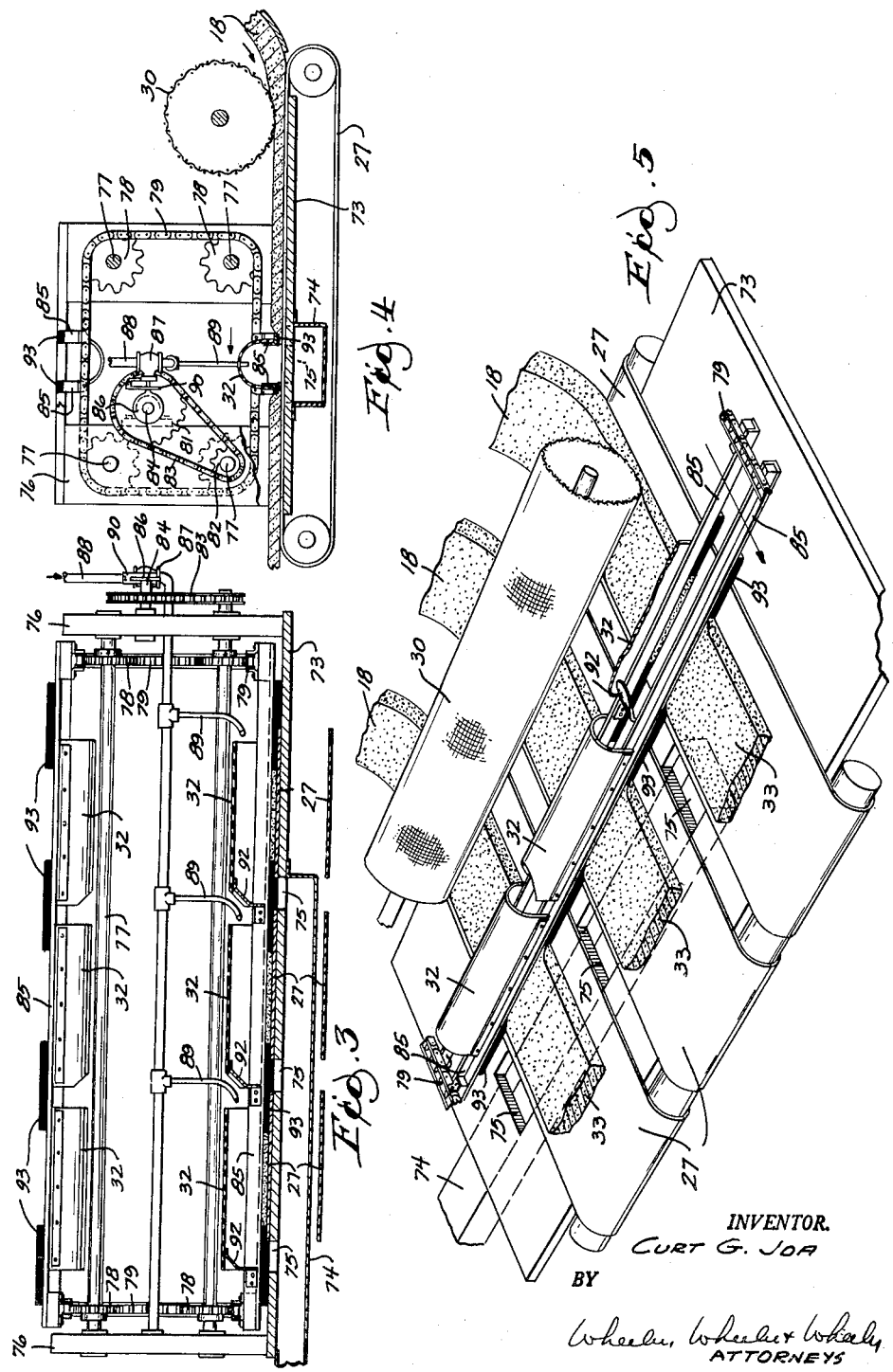

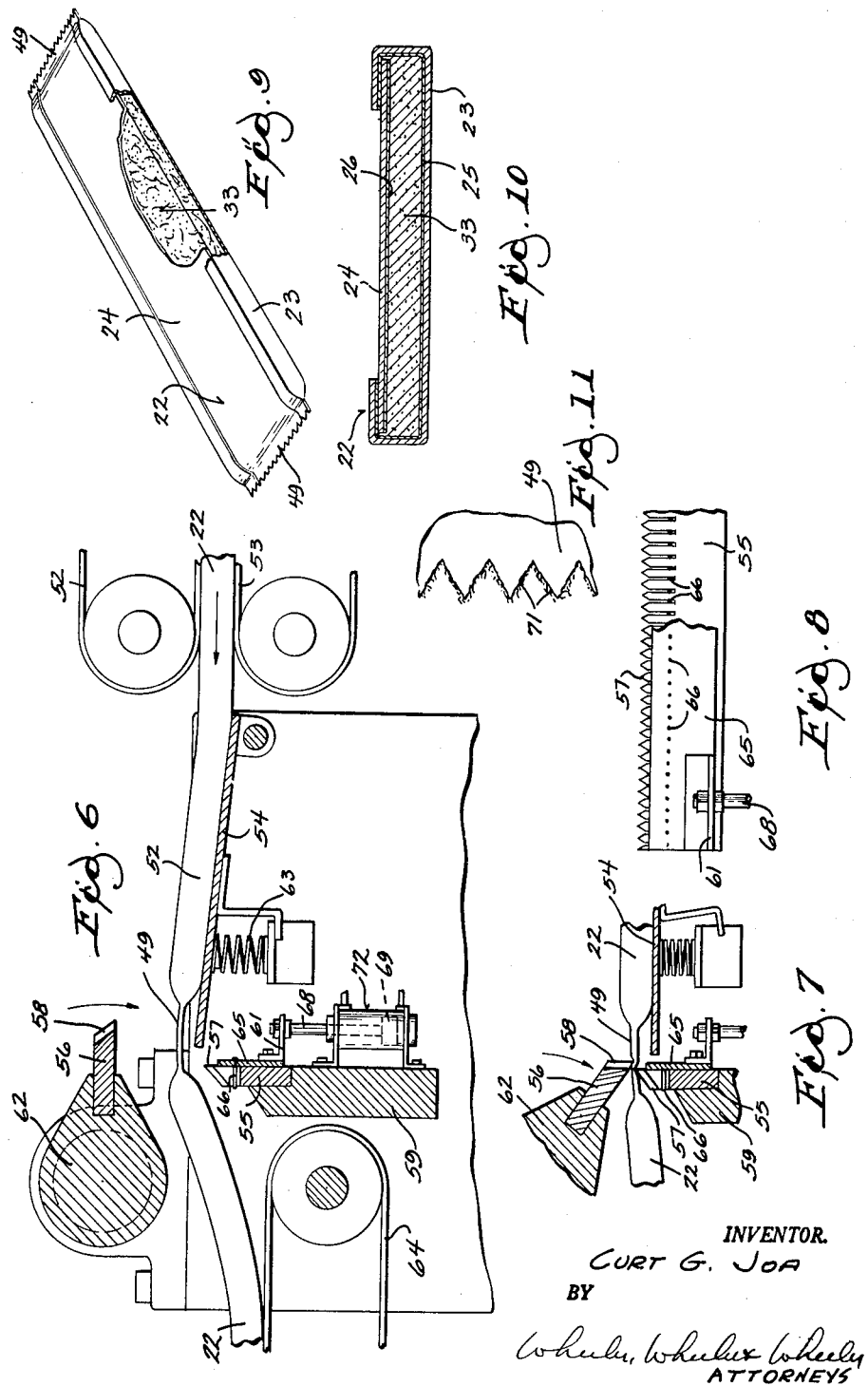

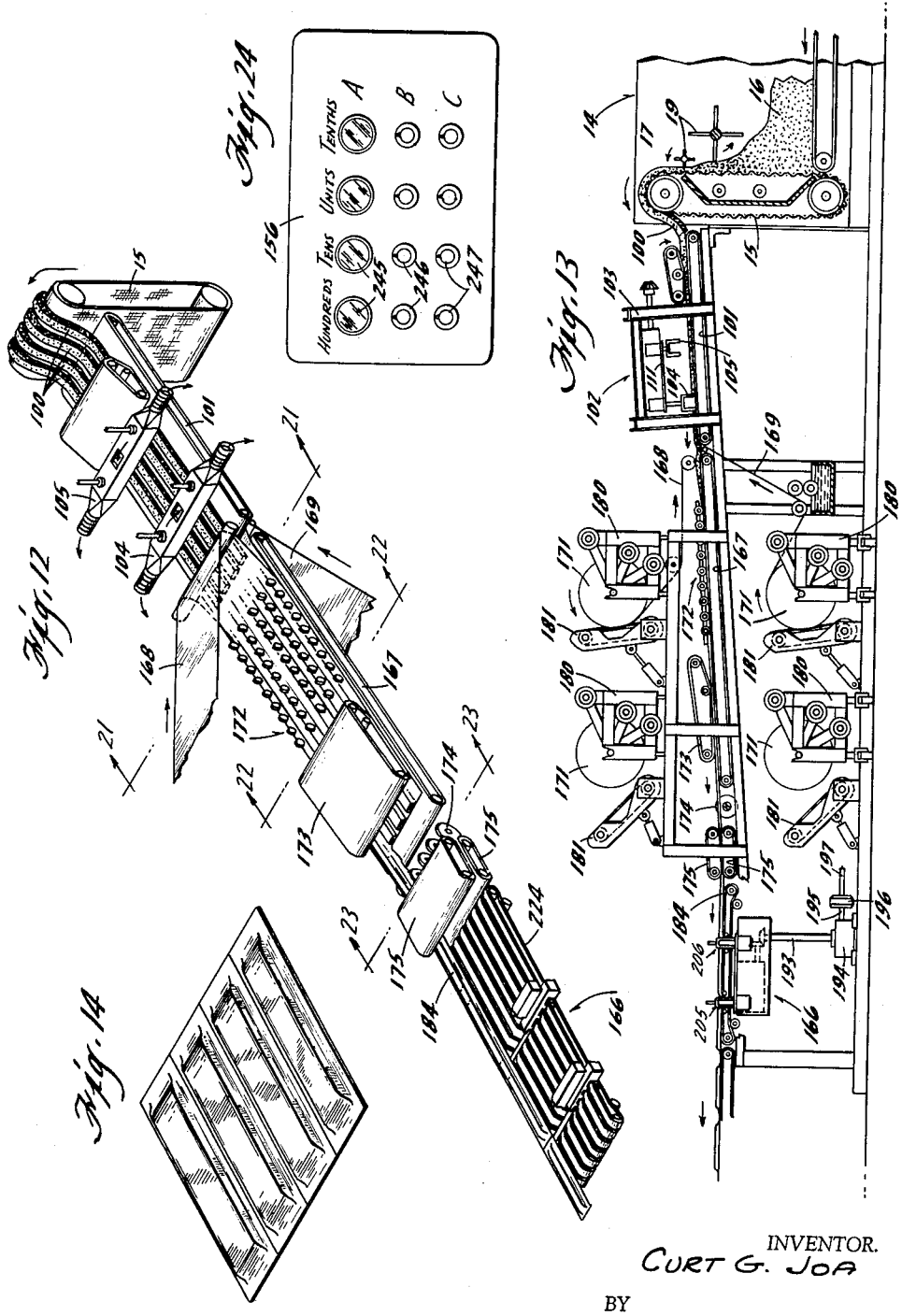

C. G. JOA 3,020,687

METHOD AND APPARATUS FOR FORMING INDIVIDUAL WRAPPED
PADS FROM OTHERWISE CONTINUOUS BATT STRIPS

Filed Sept. 15, 1958

INVENTOR.
CURT G. JOA
BY
Wheeler, Wheeler + Wheeler
ATTORNEYS

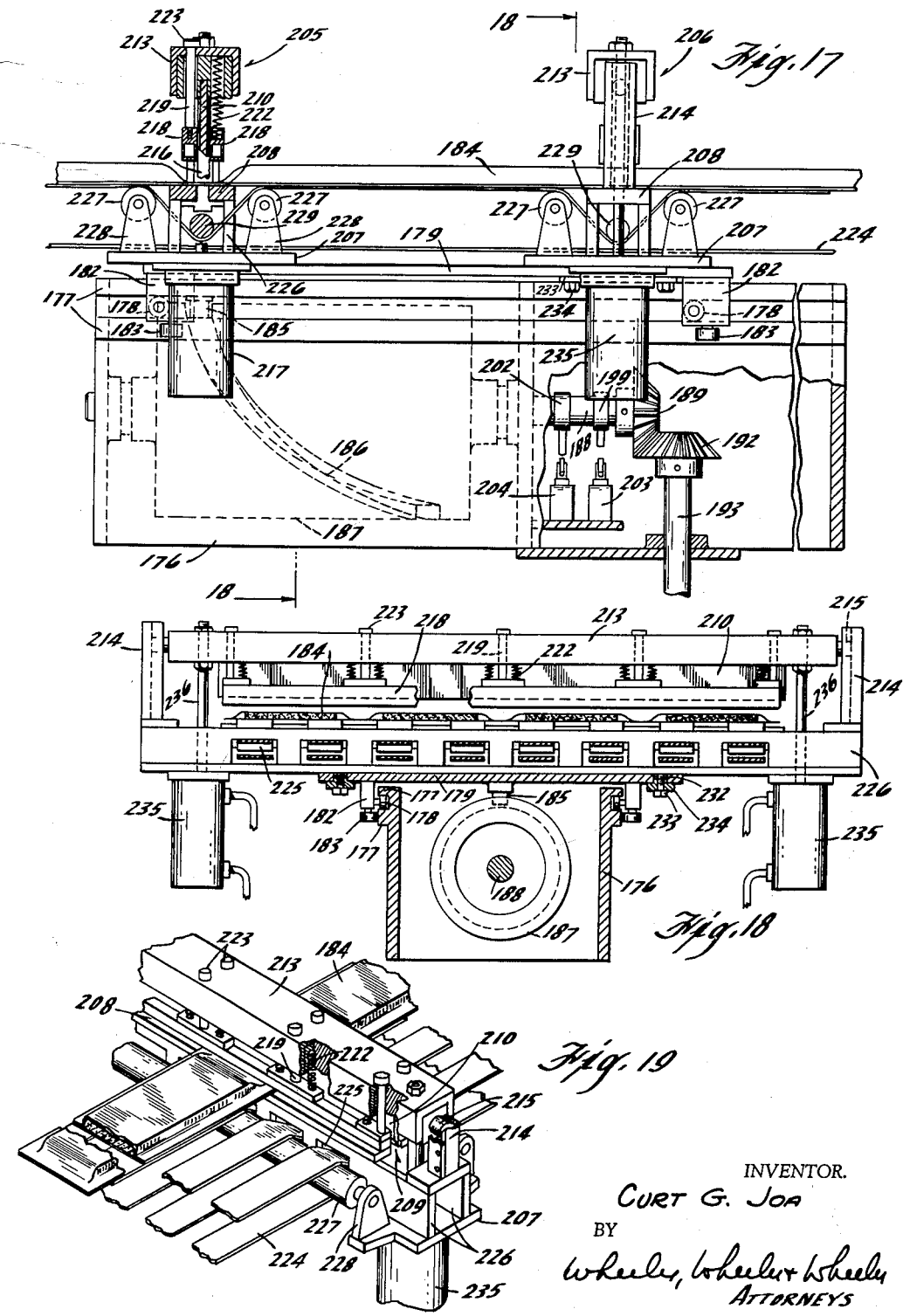

Feb. 13, 1962 C. G. JOA 3,020,687
METHOD AND APPARATUS FOR FORMING INDIVIDUAL WRAPPED
PADS FROM OTHERWISE CONTINUOUS BATT STRIPS
Filed Sept. 15, 1958 9 Sheets-Sheet 7
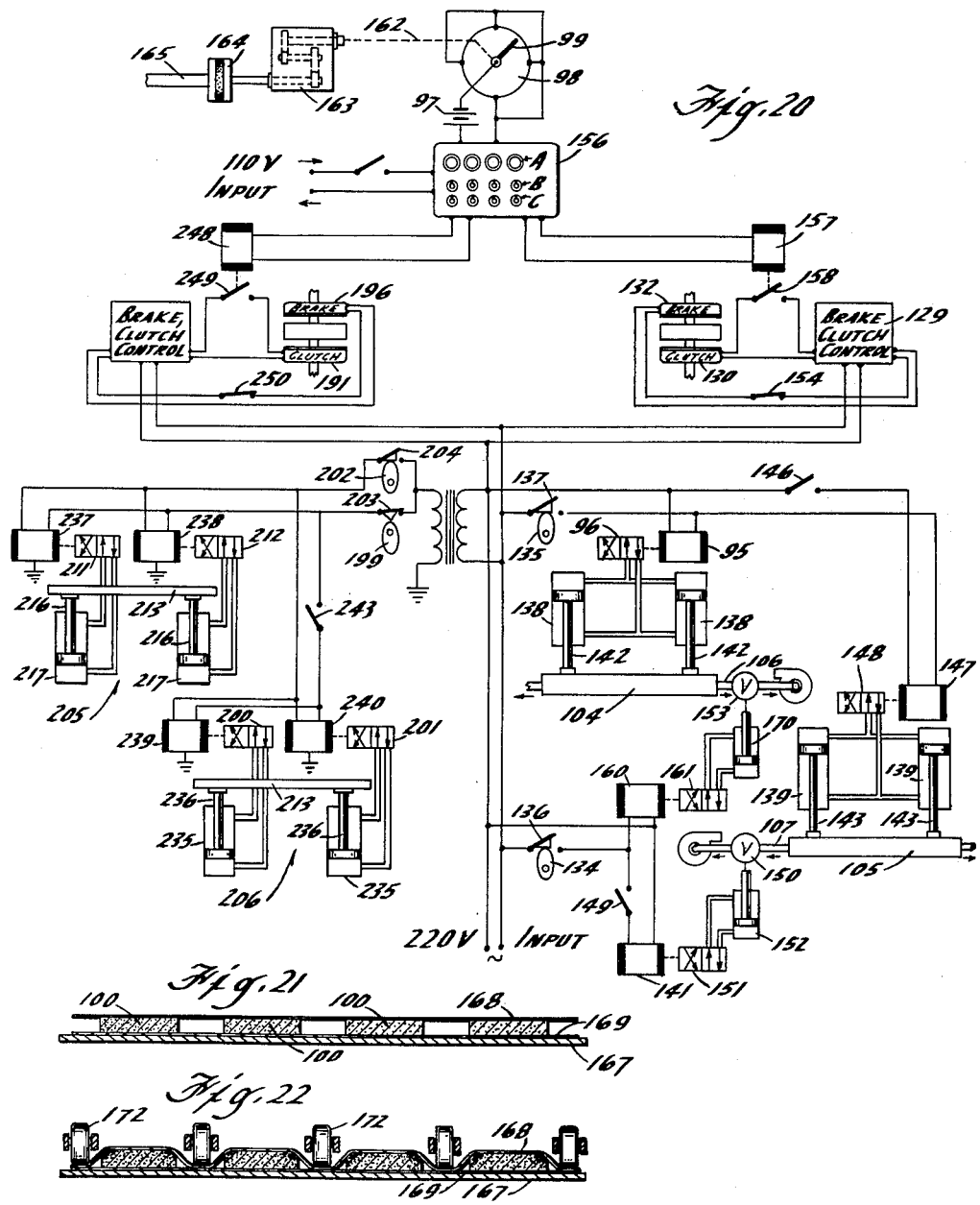
INVENTOR.
CURT G. JOA
BY
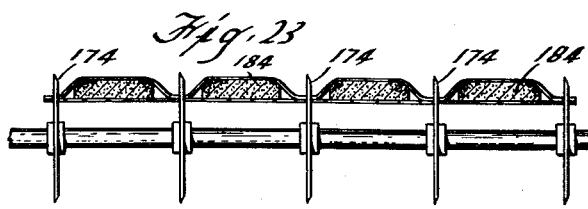
ATTORNEYS

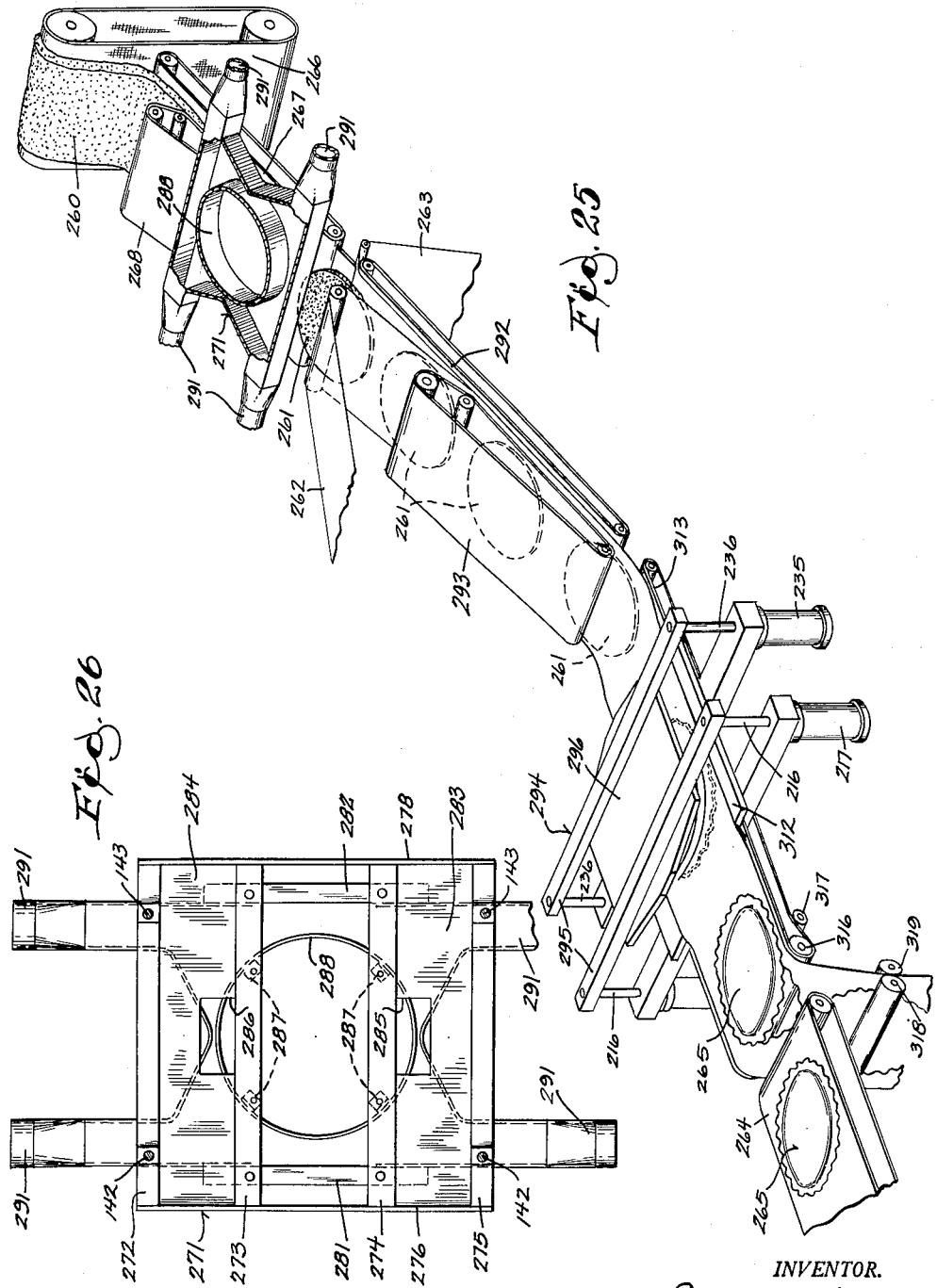

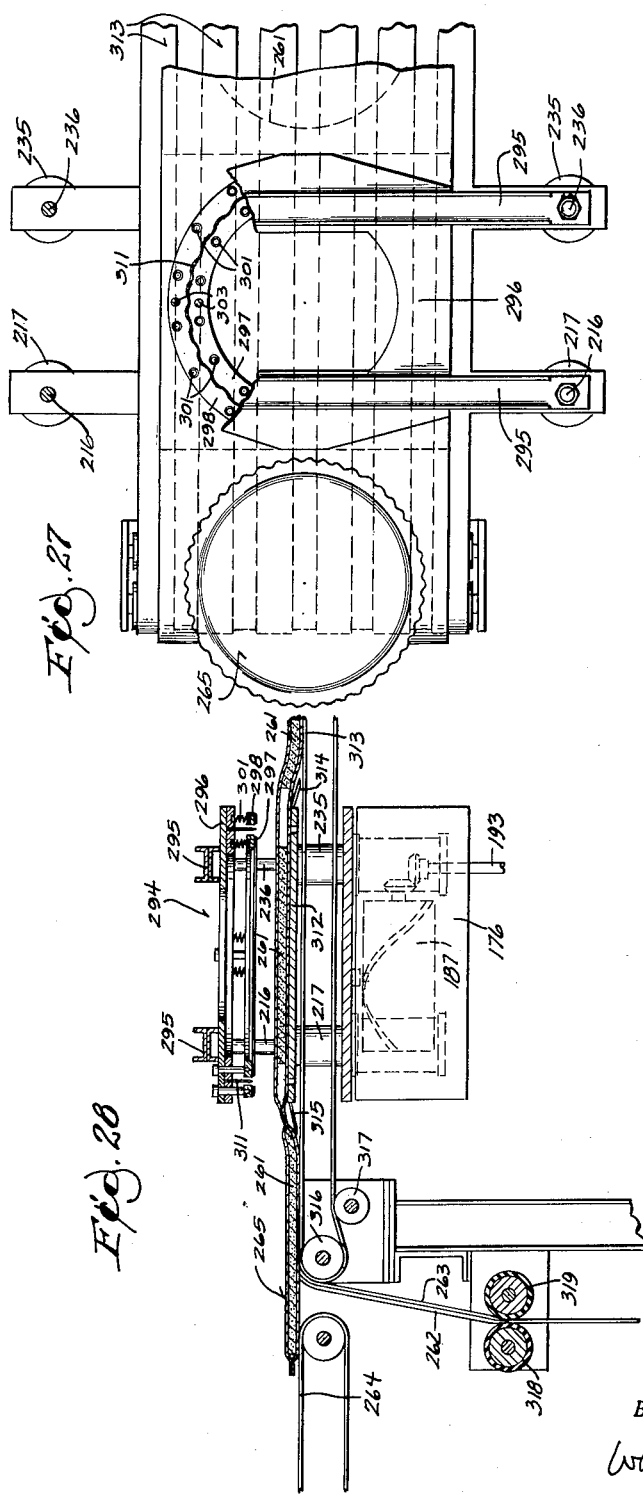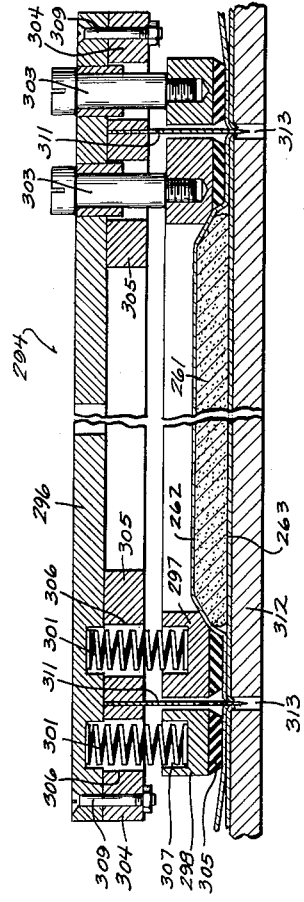

3,020,687
METHOD AND APPARATUS FOR FORMING INDIVIDUAL WRAPPED PADS FROM OTHERWISE CONTINUOUS BATT STRIPS

Curt G. Joa, Ocean Ridge, Fla., assignor to Falls Paper & Power Company, Chester, Pa., a corporation of Wisconsin
Filed Sept. 15, 1958, Ser. No. 760,963
65 Claims. (Cl. 53—23)

This invention relates to a method and apparatus for forming individual wrapped pads from otherwise continuous batt strips.

This application is a continuation-in-part of my copending application Serial No. 742,289 filed June 16, 1958, now abandoned, copending application Serial No. 664,063 filed June 6, 1957, and discloses and claims subject matter divided therefrom.

Cross reference is made to my copending applications, Serial No. 550,653 filed December 2, 1955, now abandoned, and Serial No. 646,696 filed March 18, 1957, which disclose devices for forming continuous batt strips as a procedure preliminary to procedures of the present invention.

Of course, it is immaterial to the present invention how the batt strip is initially formed, the cross referenced patent applications being cited merely as illustrative of batt forming devices and exemplifying devices which I have actually commercially used for this purpose.

In the method and apparatus of the present invention, one or more elongated strips of batt material discharged from the forming machine is divided at longitudinally spaced points into discrete portions spaced longitudinally by dividing gaps, such portions being then ensleeved in wrapping paper which is continuous across the discrete portions of batt material, as well as across the spacing gaps intervening therebetween. In the continued advance of the ensleeved strip, the opposed plies of wrapping paper in the area of the gaps are pressed together and sealed.

In one embodiment of the invention, knife means subsequently severs, preferably with a tearing stroke, the wrapping paper across the seals aforesaid to subdivide the wrapped strip into discrete wrapped pads consisting of batt material confined in sealed wrapping paper. In other embodiments of the invention the knife means severs the wrapping paper across the seals substantially concurrently with the sealing thereof. While the pads made according to the present invention may be used for any pad purposes, they are specifically intended for use as cushion pads in packaging furniture. The pads must be sturdy to withstand shipping and handling stresses and yet provide a soft cushion to protect the furniture. Moreover, the pads should not have any abrasive or rough surfaces which might otherwise scratch the furniture finish.

A unique feature of the method and apparatus of the present invention is my procedure for severing the elongated strip of batt material into discrete portions with subdividing gaps intervening therebetween. I do this by removing entirely batt material segments of substantial width from the strip. These segments are removed by a convection current induced by establishing a pressure differential across the batt segment to be removed. The resultant convection current of air or like fluid picks up the batt segment, removes it from the strip and returns it to the batt forming machine for redeposit. I have found that such pressure differential can most conveniently be established by subjecting the batt segment to vacuum. In some instances, the pressure differential is advantageously increased by impinging a stream of air or like fluid against the side of the segment opposite that subject to the vacuum.

The foregoing procedure presents a problem in that the strip of batt material is ordinarily in motion on a conveyor belt. The method and apparatus of the present invention accommodates for such motion.

In one embodiment of the present invention, a vacuum box is disposed in fixed relation to the strip conveyor. It may be continuously at sub-atmospheric pressure, or at such pressure only periodically as the strip passes the vacuum box inlet. The convection current which flows into the vacuum box is localized or channelled to confine it to effect only the batt segment to be removed by at least partially enclosing the segment with an air confining hood. I may optionally blow air, etc. into the end of the hood opposite the vacuum box inlet.

The air blower, and if desired, the vacuum pump as well, is desirably actuated only for that period of time during which the batt segment is opposite the vacuum box inlet. At all other times the air blower is disabled to permit the strip to pass without change of form.

Conitnuous strips of pre-glued wrapping paper are then applied to the longitudinally separated batt portions and the wrapping paper strips ensleeved thereabout. Thereafter, the paper is sealed in the area of the spacing gaps and severed as aforestated.

To avoid formation of abrasive material on the outer surface of the pad, such as might be formed by extrusion of conventional glue from between the plies of wrapping paper as they are squeezed together, I use a special form of adhesive which is very pliable even after it has set. Accordingly, such glue as is extruded will be very pliable, even after setting, and will not scratch finished furniture surfaces. Moreover, the wrapping paper is desirably severed by tearing it to fray out the fibers of the paper and entrapped glue. This avoids a sharp or clean cut edge which might otherwise abrade or scratch furniture finish.

In other embodiments of the invention, the vacuum box or hood is moved bodily with the batt conveyor and at the same speed while subject to vacuum. The vacuum box or hood may also be moved to and from engagement with the batt conveyor in a cycle of operations which permits ready change in the spacing between the dividing gaps.

In one embodiment of the invention, two vacuum hoods relatively adjustable toward and away from each other are used for relatively short spacing between dividing gaps. For longer spacings, a single vacuum hood is sufficient.

In this embodiment of the invention, the embossing apparatus for sealing the wrapping paper across the gaps is operated in timed coordination with the batt divider vacuum hoods to accommodate for the changes to gap spacing effected by the aforesaid adjustment of the batt divider cycle. The embossing apparatus desirably comprises two embossing bars relatively adjustable toward and away from each other (comparable to the batt divider vacuum hoods) and timing apparatus for concurrently adjusting and timing the batt divider and embosser.

If the batt divider is spaced from the embosser a distance which is an exact whole number multiple of the spacing between dividing gaps, the embosser and divider are timed to concurrently cycle in step. However, any change in the spacing between dividing gaps which will result in a distance between the divider and embosser which includes a fractional number multiple of the spacing between dividing gaps will throw the embosser out of step with dividing gaps in the ensleeved pads passing the embosser if the time cycle of the embosser is initiated concurrently with the time cycle of the batt divider.

In the method and apparatus of the present invention, the time cycle of the embosser is synchronized or justified with respect to the time cycle of the divider to lock the embosser in time with the dividing gaps brought opposite the embosser by the batt conveyor regardless of gap spacing in the batt strip. The justifying apparatus desirably includes a timer which offsets the time of initiation of the embosser cycle from the time of initiation of the divider cycle in an amount exactly required to justify the cycle of the embosser with the spacing of dividing gaps in the ensleeved batt. Accordingly, the divider and embosser may be located a fixed distance apart, regardless of the length of the pads formed by the batt divider.

The method and apparatus of the present invention can be adapted to form pads of any desired configuration. Ordinarily the desired pad shape will be rectangular and several embodiments of the apparatus herein disclosed are adapted to fabricate rectangular pads. Another embodiment herein disclosed is designed to fabricate circular pads of the type adapted to be positioned over a fruit basket or the like, to cushion the basket and its contents during shipment. In this embodiment both the batt dividing hood and the combination embosser-knife unit have batt treating elements which are circular in plan and which are respectively adapted to divide the batt into circular segments and to subsequently seal the wrapping paper around the circular pads and to sever the wrapper paper through the annular seal.

Other objects, advantages and features of the invention will be more apparent from an examination of the following disclosure in which:

FIG. 1 is a diagrammatic perspective view showing a simplified form of apparatus for practicing the present invention.

FIG. 2 is a side elevation, partly in cross section, showing in more detail the apparatus diagrammatically illustrated in FIG. 1.

FIG. 3 is a cross sectional view taken along the line 3—3 of FIG. 4 and is a vertical cross section taken through the vacuum box and associated apparatus.

FIG. 4 is an end view, partly in cross section and partly in elevation, of the device shown in FIG. 3.

FIG. 5 is an enlarged fragmentary perspective view showing the vacuum box and associated apparatus.

FIG. 6 is a greatly enlarged fragmentary view, partly in cross section, of the cut-off apparatus for severing the ensleeved strip into individual wrapped pads.

FIG. 7 is a fragmentary view similar to FIG. 6 but showing the position of the parts during severing coaction of the knife blades.

FIG. 8 is a fragmentary side view of the stationary knife blade and its push-off blade.

FIG. 9 is a perspective view on a reduced scale showing a cushioning pad as produced by the method and apparatus of the present invention.

FIG. 10 is an enlarged cross section taken through the completed pad of FIG. 9.

FIG. 11 is an enlarged fragmentary plan view of the severed margin of a pad.

FIG. 12 is a diagrammatic perspective view showing a simplified form of modified apparatus for practicing the present invention.

FIG. 13 is a side elevation, partly in cross section, showing in more detail the apparatus diagrammatically illustrated in FIG. 12.

FIG. 14 is a perspective view showing a group of pads fabricated in the apparatus shown in FIGS. 12 through 23.

FIG. 17 is an enlarged side elevation, partly in section, through the embosser shown only diagrammatically and on a reduced scale in FIG. 13.

FIG. 18 is a cross section taken along the line 18—18 of FIG. 17.

FIG. 19 is a fragmentary perspective view of one of the embossing bars and associated apparatus of the device shown in FIGS. 17 and 18.

FIG. 20 is a simplified combined electrical and pneumatic circuit diagram of the control apparatus for the embodiment of the invention shown in FIGS. 21 through 23.

FIG. 21 is a cross section taken along the line 21—21 of FIG. 12.

FIG. 22 is a cross section taken along the line 22—22 of FIG. 12.

FIG. 23 is a cross section taken along the line 23—23 of FIG. 12.

FIG. 24 is an enlarged view showing the panel of the timer 156 of the circuit shown in FIG. 20.

FIG. 25 is a diagrammatic perspective view showing another modified form of apparatus for practicing the present invention.

FIG. 26 is a plan view of the batt dividing hood used in the embodiment of the invention shown in FIG. 25.

FIG. 27 is a plan view, partly broken away in horizontal section, of the combination embosser-knife unit for the device shown in FIG. 25.

FIG. 28 is a side elevation, partly in vertical cross section taken through the embosser-knife unit, of the structure shown in FIG. 27.

FIG. 29 is an enlarged fragmentary vertical cross section taken through the embosser-knife unit.

Figure 15:
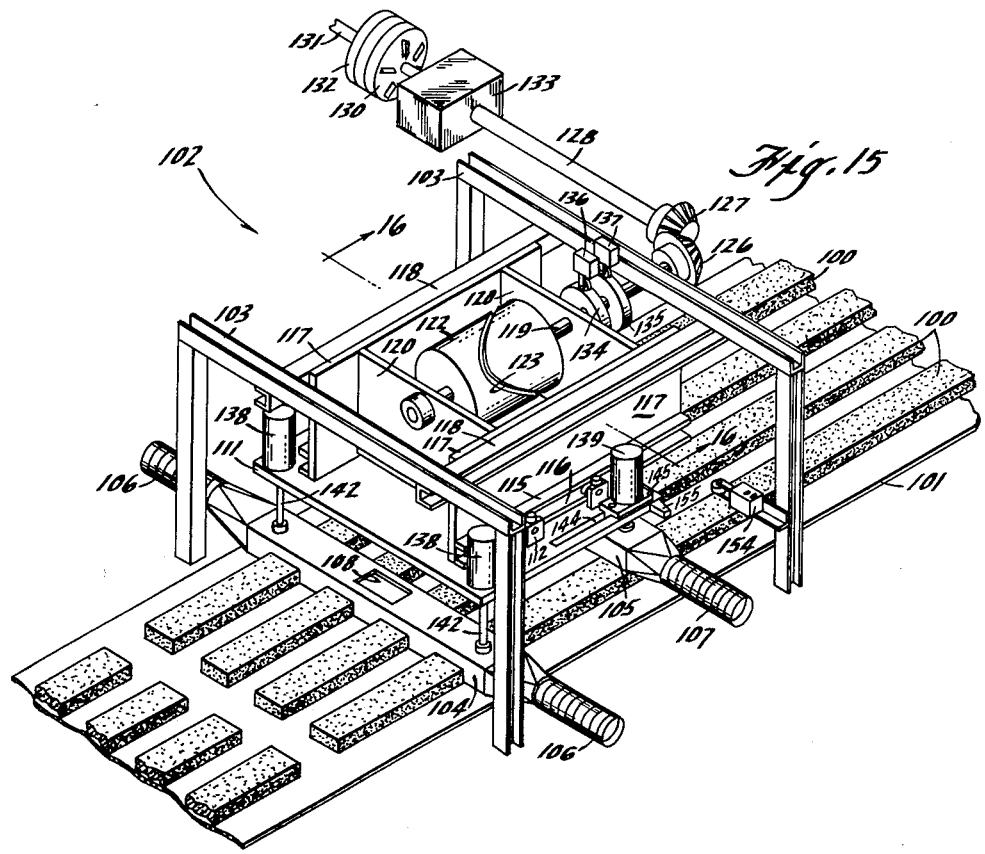
FIG. 15 is an enlarged fragmentary perspective view showing the batt divider of which fragmentary portions only are shown in FIGS. 12 and 13.
Figure 16:
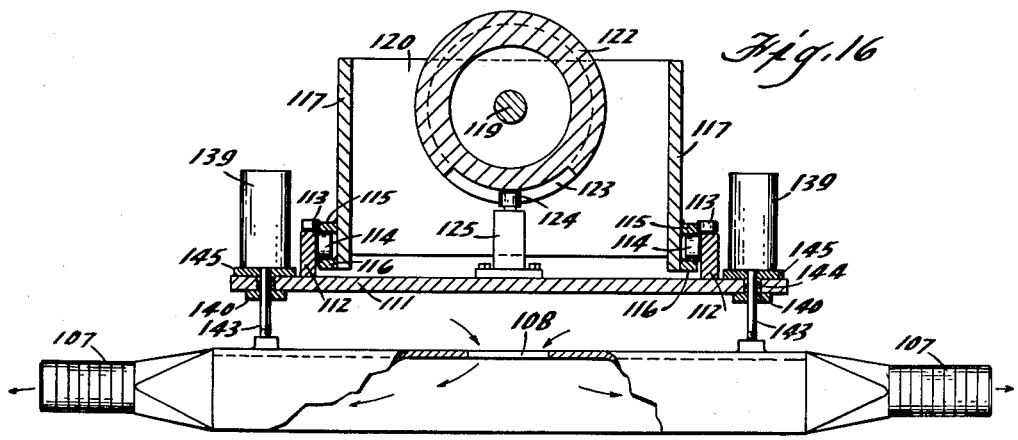
FIG. 16 is a fragmentary cross section taken along the line 16—16 of FIG. 15.

The batt forming apparatus more fully described in my prior applications aforesaid is illustrated diagrammatically at 14 at the right in FIG. 2 and includes a screen 15 on which fibrous material 16 is deposited in the form of a batt 17 which is discharged from the screen in the form of a batt strip 18. As in the devices of my co-pending applications aforesaid, a leveling device 19 functions to provide for substantially uniform thickness and density of the batt material.

The end product of the method and one embodiment of the apparatus of the present invention is illustrated in FIG. 9 as a cushion pad 22 which may be used for packing. A particular use for pad 22 is as a filler pad in furniture shipping cartons. The loosely compacted section 33 of batt material is not self-sustaining and is ensleeved in a wrapping paper cover consisting of a base strip 23 having its side margins formed in channels to receive therein the batt 33 and to marginally overlap a cover wrapping strip 24.

To keep the batt section 33 secure against dislocating movement within the wrapping paper, the inner surfaces of the wrapping strips 23, 24 are coated with glue layers 25, 26. Accordingly, the batt section 33 will be anchored against shifting movement within its wrapper.

FIG. 1 diagrammatically illustrates my novel method and one apparatus embodiment for forming the pads 22. The continuous strip 18 of batt material discharged from the forming machine 14 is received on belt conveyor 27 on which it is conveyed past appropriate means for creating a convection current of air. As illustrated in FIG. 1, the inlet or nozzle 28 of a vacuum pump or blower 31 may be disposed at one side of the belt 27 and a source 29 of air under pressure may be disposed at the other side of the conveyor 27. Accordingly, a stream of air can be blown across the conveyor 27 to remove by convection a segment of batt material intervening between the nozzles 28, 29.

To localize and channel the convection current, I find it desirable to temporarily position on the strip 18 an air hood 32 which desirably presses down on spaced portions of the batt strip 18 to define the batt segment removed by the convection current. This procedure subdivides the strip 18 into discrete batt portions 33 longitudinally spaced by gaps 47.

It is broadly immaterial if all of the apparatus 28, 29, 32 moves as a unit with the conveyor 27 in the course of removing the batt segment by convection. In one form herein illustrated, the vacuum tube 28 and air nozzle 29 are relatively stationary and intermittently operated in time with the advance of conveyor 27 to remove batt segments at points appropriately spaced in the strip.

In any event, the strip 18 is sub-divided into discrete spaced batt sections 33 which are discharged from conveyor 27 onto the strip 23 of wrapping paper which is drawn over the roll 34 and onto apron 42. The strip 23 is unwound from a supply roll 35 and passes through gluing apparatus 36 including a glue tank 37 and transfer roll 38 which coats the surface of the strip 23 which is uppermost on apron 42.

The upper strip 24 of wrapping paper is applied to the upper surface of the batt after having been unwound from a supply roll 43 and having received a coating of glue from glue tank 44 and transfer roller 45. Strip 24 is substantially the same width as the batt strip 18 but strip 23 is somewhat wider. Accordingly, the edge margins of strip 23 may be folded by conventional folding plows 46 to form the channels aforesaid and overlap the wrapping strip 24. As illustrated in FIG. 2, the plows 46 may gradually taper toward their outlet ends to press the wrapping paper against the ensleeved batt sections 33 while the adhesive at least partially sets.

In the foregoing operation, the wrapping paper ensleeves the spaced discrete batt sections 33 and the gaps 47 therebetween.

As the ensleeved longitudinally spaced batt sections 33 are discharged from conveyor 39, the sealing dies 48, timed to coact only when the gaps 47 are therebetween, press together portions of the wrapping strips 23, 24 which are at opposite sides of the gaps 47 between the batt sections 33. Accordingly, the glue coated on the facing surfaces of the strips seal the strips together under pressure of the dies 48 to constitute connective links 49 between the respective pads 22.

After sealing, the pads 22 are further compressed between the coacting belt conveyors 52, 53 during continued advance thereof. Meanwhile the glue coatings 25, 26 have time to set and the spaced discrete uncut pads 22 are in due course discharged from the conveyors 52, 53 onto a spring biased apron 54 preceding the pad severing apparatus shown diagrammatically in FIG. 2 and in greater detail in FIGS. 6–8.

The apparatus for severing the wrapped batt strip through the flattened and sealed connective links 49 intervening between the pads 22 consists of coacting knife blades 55, 56 respectively having teeth serrations 57, 58 which intermesh in the coaction of the blades. Stationary knife 55 is mounted on a fixed support 59. Movable knife 56 is mounted on a rotary shaft 62 having an axis of rotation offset rearwardly from knife 55. Accordingly, knife 56 sweeps past knife 55 in a downward and rearward direction.

Apron 54 is normally biased by spring 63 to its position shown in FIG. 6 in which the discharge end of the apron 54 is above the level of the teeth 57 of knife 55. Accordingly, except during the time of knife coaction, the conveyors 52, 53 will simply feed the linked pads 22 through the gap between the knives 55, 56 and onto the take-away conveyor belt 64. However, when rotary knife 56 reaches its position shown in FIG. 7 in which its teeth 58 cooperate with the teeth 57 of the knife 55, the downward component of thrust of knife 56 will compress spring 63 and depress apron 54 to lower the connective links 49 onto teeth 57 of blades 55. After severance of the links 49, spring 63 will bias the apron 54 to its elevated position shown in FIG. 6 in which the pad 22 will clear the stationary knife 55 in its continued advance through the machine.

To insure disengagement of the teeth 57 of stationary knife 55 from the severed edges of the connective links 49, knife blade 55 is provided with a push-off plate or bar 65 mounted for reciprocation on the knife 55 by reason of the engagement of its pins 66 with slots 67 formed in the blade 55. The push-off bar or plate 65 is provided with a bracket 61 connecting it to rod 68 of the piston 69 of a fluid operated motor 72. Conventional means (not shown) is provided for co-ordinating the motor 72 with the rotation of shaft 62 for actuating the fluid operated motor 72 immediately after the link 49 is severed. Accordingly, push-off plate 65 assists the spring 63 in clearing the fibers 71 of the link 49 from entanglement with the teeth 57 of the blade 55.

The serrated co-acting teeth 57, 58 are regarded as of considerable significance in the present invention in that a sharp or clean cut severed edge in the link 49 is avoided. By reason of the meshing teeth 57, 58 the connective link 49 is torn in the course of knife coaction therewith. Accordingly, the fibers 71 of the link 49 are frayed out as illustrated in FIG. 11. The fraying or tearing action aforesaid is attributed to the difference in peripheral speed of radially offset portions of the serrated knife teeth.

The frayed out fibers 71 are softer and more pliant and less damaging to furniture finish than would be a clean-cut edge, particularly if such edge contains hardened glue. The tearing action aforesaid not only frays out the fibers of the paper but frays out such glue as is extruded from between the plies of wrapping paper.

To further reduce the possibility of abrading furniture finish, I use for an adhesive a product which desirably sets in pliable form. Asphalt has been used successfully as well as a rubber base adhesive sold by the 3–M Company under its mark "E–1025."

The detailed construction of the first apparatus embodiment for dividing the batt strip 18 into discrete spaced portions is shown in FIGS. 3, 4 and 5. In practice, there may be more than one strip 18 discharged from the batt forming machine 14. In FIGS. 3 through 5, three such strips are illustrated. These may first be compacted slightly against conveyor belt 27 and its underlying apron 73 by the compacting roll 30. The apron 73 is provided with ports 75 intervening between the laterally spaced belt runs 27 and its underlying apron 73 by the compacting roll 30. The apron 73 is provided with ports 75 intervening between the laterally spaced belt runs 27 and communicating with a vacuum duct 74 suspended from the apron 73. Accordingly, the ports 75 are laterally offset from the path of travel of the respective batt strips 18.

As shown in FIGS. 3 and 4, the edge margins of the apron 73 support side plates 76 which are provided with bearings for the four cross shafts 77 to which end sprockets 78 are applied. The sprockets 78 mesh with interconnecting chains 79. One shaft 77 has an additional sprocket 82 meshing with the driving chain 83. Chain 83 meshes with drive sprocket 81 mounted on shaft 84. Shaft 84 desirably receives through conventional mechanism (not shown) power from the same source as drives the conveyor belts 27. Accordingly, the chains 79 move in timed coordination with the belts 27.

Laterally aligned spaced air hoods 32 are mounted on the chains 79 as best shown in FIG. 5. At spaced intervals along the chain 79, are provided paired cross-bars 85 on which the hoods 32 are screwed or otherwise secured. In the specific apparatus illustrated, chains 79 are provided with two sets of paired bars 85 and hoods 32. In this embodiment of the invention, the longitudinal spacing between the sets of hoods determines the spacing between the gaps 47 formed in the batt strips 18. The lowermost shafts 77 for chains 79 are relatively widely separated so that a set of hoods 32 will be positioned against the advancing batt strips 18 before the portions of the batt covered by the hoods reach the vacuum duct 74. Even if the duct 74 is continuously at sub-atmospheric pressure, batt material will not be removed from the strip until the hoods 32 are laterally aligned with the inlets 75, thus to direct the stream of air entering the inlets 75 through the hoods and against the batt segments. Of course, I may optionally provide conventional apparatus to evacuate duct 74 only periodically, with the hoods 32 in their position substantially as shown in FIG. 4.

At the position of the parts shown in FIG. 4, a timing cam 86 mounted on shaft 84 engages the actuator 90 of valve 87 in the compressed air supply pipe 88.

Pipe 88 supplies air under pressure to the nozzles 89. Note that the nozzles 89 are directed laterally into the hoods 32 which have their respective end walls 92 at an appropriate angle to direct the convection current of air induced by the vacuum duct 74 and pressure of nozzles 89 into the ports 75 which are then directly below the inclined ends 92 of the hoods 32. The stream of air picks up by convection the loosely compacted fibers of the segments of batt material localized beneath the hoods 32 and carries such fibers through the vacuum duct 74 to a point of deposit which may conveniently be the mass of batt material in the batt forming machine 14.

In some cases, vacuum alone is sufficient to remove the segment of batt material from beneath the hoods 32. In other cases, the addition of pressurized air from the nozzle 89 is beneficial. In any event, gaps 47 intervening between spaced batt portions 33 are formed by removing by convection segments of batt material beneath the hoods 32. To prevent loss of vacuum, the bars 85 may be provided with sealing pads 93 of rubber or the like which bridge across the conveyor belts 27 between the laterally spaced batt strips 18.

The removal of batt material segments occurs concurrently with continued forward movement of the conveyor belts 27. Substantially immediately after the batt material segment has been removed from beneath the hoods 32, cam 86 will have rotated to the point where actuator 90 for valve 87 is released to shut off the supply of air to nozzles 89 and de-energize blower 31. Accordingly, the batt strips 18 between the spaced sets of hoods 32 are not displaced by any convection current until the next set of hoods 32 is positioned upon the batt strips and reach FIG. 4 position when cam 86 again actuates valve 87 and blower 31.

The pad forming apparatus shown in FIGS. 12 through 24 permits ready and convenient change in the length of the pads which are fabricated on the machine and without requiring such sprocket and hood adjustment as would be required in the embodiment of the invention shown in FIGS. 3 and 4. In this embodiment of the invention, and by appropriate setting of the control apparatus shown schematically in FIGS. 20 and 24, the length of the pads produced on the machine can be easily changed and the timing of the batt divider and the pad embosser concurrently justified.

In the embodiment of the invention shown in FIGS. 12 through 24, the batts 100 are formed in the apparatus 14 in the same manner as shown in FIG. 2 with respect to which identical parts are given the same reference characters. The continuous strips 100 of batt material which are desirably laterally spaced, as is also the case in FIG. 5 hereof, are received on a belt conveyor 101 by which they are conveyed past a batt divider or clean-out apparatus indicated generally by reference character 102. The batt divider 102 includes a support frame 103 on which vacuum boxes or hoods 104, 105 are mounted for reciprocation on the frame and in the same direction as conveyor 101. Vacuum hoods 104, 105 function in a manner broadly similar to the hoods 32 of the embodiment of the invention shown in FIGS. 1 through 10. In the device of this embodiment of the invention, hoods 104, 105 are provided with flexible vacuum connections 106, 107 at each of their ends and the hoods have their top portions provided with air inlet ports or apertures 108. The hoods have no bottom wall so that when clamped downwardly over the batt strips 100 and against the conveyor 101, they will confine portions of the batt strips therewithin for pneumatic removal from the conveyor when vacuum is applied to the flexible hoses 106, 107.

Both vacuum hoods 104, 105 are mounted on the same carriage plate 111 which has side rails 112 (FIG. 16) on which roller wheels 113, 114 are respectively mounted on vertical and horizontal axles. Rollers 114 ride between upper and lower guide rails 115, 116 and rollers 113 ride on the edge margin of upper guide rail 115. Guide rails 115, 116 are mounted on upright plate 117 which are fastened to cross members 118 interconnecting the frame members 103.

Plates 117 carry cross plates 120 in which the shaft 119 for the cam drum 122 is journaled for rotation on the axis of the drum 122. The drum 122 has a surface cam groove 123 into which projects the cam follower roller 124 connected by bracket 125 to the reciprocating carriage plate 111.

Shaft 119 is connected through meshing bevel gears 126, 127 to drive shaft 128 which receives power from the power input shaft 131 through a conventional combined electric clutch 130 and brake 132 and gear reduction box 133. Shaft 119 also carries cam discs 134, 135 which respectively actuate switches 136, 137 in the circuit shown in FIG. 20.

Rotation of cam drum 122 will reciprocate carriage 111 and will concurrently reciprocate vacuum hoods 104, 105. The respective vacuum hoods are pneumatically powered for advance towards and retraction away from the batt conveyor belt 101 and batt strips 100 thereon by means of pairs of pneumatic motors including cylinders 138, 139. The cam drum 122 and pneumatic motors 138, 139 comprise means for moving the hoods 104, 105 on orbital paths which include paths on which the hoods advance and retract with respect to the batt strip and paths on which the hoods move parallel to the batt strips. On one of said parallel paths the hoods move with the conveyor 101 and are engaged with the batt strips and on the other parallel paths the hoods move counter to the conveyor 101, but are retracted away from engagement with the batt strips.

Piston rods 142 for cylinders 138 extend through appropriate openings in the carriage plate 111. Vacuum hood 104 is fixed longitudinally with respect to the carriage but may be raised and lowered with respect thereto. Piston rods 143 for the cylinders 139, however, extend through slots 144 formed along the margins of the carriage plate 111 so that the vacuum hood 105 can be adjusted longitudinally along the carriage and with respect to the vacuum hood 104. Cylinders 139 are mounted on T-shaped slide blocks 145 guided in the slot 144. Lock nuts 140 are used to fasten the hood 105 in any position to which it is adjusted along slides 144. Vacuum hood 104 only is used for pad lengths 20 inches in length or longer. Vacuum hood 105 is used together with vacuum hood 104 for pad lengths shorter than 20 inches. Accordingly, for pads 20 inches or longer, manual switch 146 (FIG. 20) is opened. This de-energizes relay 147 which operates pneumatic valve 148 to hold hood 105 in elevated position. Manual switch 149 is also opened to appropriately actuate relay 141, pneumatic valve 151 and pneumatic motor 152 to close damper valves 150 in the ducts 107 to the vacuum hood 105. In effect, this disables vacuum hood 105 for pad lengths 20 inches and longer. For pad lengths less than 20 inches in length, manual switches 146, 149 are closed, thus conditioning the pneumatic cylinders 139 and the valve 150 for operation together with cylinders 138 and damper valve 153 for the vacuum box 104 pursuant to actuation of the cam operated switches 136, 137.

The electric clutch 130 and brake 132 are subject to control of the control unit 129 in an electric circuit including switch 154 which is in the path of the striker arm 155 on the carriage plate 111. When the carriage 111 returns to its initial position in its cycle of operations, striker arm 155 engages switch 154 to de-energize clutch 130 and set the brake 132, pending a re-cycling signal from the timer 156 which energizes relay 157 to close switch 158 to release the brake and energize the clutch.

The cycling of the batt divider 102 is based upon a 20 inch cycle. Main input drive shaft 131 rotates at a speed which will rotate the cam drum 122 one revolution for each 20 inches of travel of conveyor 101. The profile of the cam drum groove 123 is such that the velocity of the carriage 111 during its forward stroke is the same as the velocity of the conveyor 101. Control unit 156 aforesaid triggers both the embossing unit hereinafter to be described and the batt divider unit 102. However, to simplify explanation, the operation of the batt divider only will be first described. Inasmuch as the batt divider unit is designed for a basic cycle of 20 inches, I will first describe the 20 inch pad length cycle.

20 inch pad length cycle

The adjustable hood or vacuum box 105 is not required in this cycle and is electrically disconnected by opening switches 146, 149 aforesaid. Cylinders 139 will thus hold hood 105 in its raised position. Only hood 104 remains subject to control of the cam operated switches 137, 136.

In this cycle cam drum 122 will continuously rotate and the limit switch 154 will have no function because the clutch 130 will be constantly engaged.

Assuming the carriage 111 to be at its rearmost or initial point in its cycle of operation and is just starting forwardly, cam 135 is timed to close switch 137 and energize air cylinders 138 through relay 95 and pneumatic valve 96 to lower hood 104 onto the batt strips 100 and the conveyor 101 during the first one inch acceleration period of carriage travel. The profile of the cam is such that after carriage movement through one inch of conveyor movement the hood will be up to conveyor speed so that just as the hood engages the batt, the carriage will have reached a uniform velocity exactly matching the conveyor velocity. At this point cam 134 closes switch 136 to appropriately actuate relay 160, pneumatic valve 161 and pneumatic motor 170 to open the damper valve 153 in the vacuum line to the hood 104, thus subjecting the hood 104 to a strong pressure differential across batt portions trapped therewith.

Batt portions within the hood are thus pneumatically conveyed therefrom and return to the feeder 14 as aforestated. The batt material is exhausted from the hood at both of its ends to insure positive and rapid removal of batt material, thus to promote high speed operation of the apparatus.

When the cam drum has completed 6 inches of forward movement of the carriage at uniform velocity (7 inches from its starting point), cam 134 opens switch 136 to close the damper valve 153 and discontinue evacuation of the space enclosed by hood 104.

When the cam drum has completed 9 inches of its forward stroke and the carriage begins to decelerate, cam 135 opens switch 137 to reverse valve 96 and raise the hood 104 from contact with the conveyor 101. The hood 104 will be lifted during the last one inch of cam drum drive. In this part of the cycle the carriage decelerates from conveyor speed to a full stop. As the cam drum continues to rotate, the carriage will reverse direction and return to its strating point. With the timer 156 set for a 20 inch cycle, the carriage will recycle immediately on return to its starting point and simply reciprocate continuously to subdivide the batt strips 100 into 20 inch lengths. At this point the function of the control unit or timer 156 will briefly be explained.

Timer 156 is a commercial, high speed, four digit, dual, pre-set electronic counter which receives its impulses at the rate of ten impulses or counts for each inch of batt travel from an energy source such as the battery 97 connected in a circuit including a stepping switch 98 having its arm 99 mounted on a shaft 162 connected through appropriate transmission 163 and a flexible coupling 164 to any suitable rotating part 165 on the conveyor mechanism. Arm 159 will rotate at such a speed that ten electrical impulses will be supplied to the timer 156 for each inch of travel of the conveyor belt 101. Accordingly, the timer will operate in synchronism with the conveyor belt 101.

For a 20 inch cycle the timer circuit which triggers relay 157 is set to count 200. Accordingly for every 20 inches of conveyor travel, relay 157 will be actuated and switch 158 will close to energize clutch 130 and release brake 132. Accordingly, just as the carriage 111 returns to its starting point after having cycled through 20 inches of conveyor travel, switch 158 will close to initiate the next carriage cycle.

15 inch pad length cycle

To subdivide the batt strips into lengths shorter than 20 inches, for example, 15 inches, the adjustable hood 105 is slid along the slots 144 and is set a distance of 15 inches from the fixed hood 104. If the respective cylinders 138, 139 for both of the hoods 104, 105 are now actuated concurrently and the batt divider is set to cycle once for every 30 inches of conveyor travel, pads 15 inches in length will be divided therefrom. Switches 146 and 149 in the circuit of FIG. 20 are closed for concurrent actuation of both pairs of fluid motors 138, 139 and both sets of damper valves 150, 153. Inasmuch as the basic pad cycle is 20 inches and the batt divider is now required to operate on a 30 inch cycle, dwell equivalent to 10 inches of conveyor travel is introduced between the termination of one cycle and the initiation of the next cycle. For this purpose, the timer circuit which triggers relay 157 is set to count 300. At the end of each basic 20 inch cycle of the carriage 111, limit switch 154 is actuated to set brake 132 and de-energize clutch 130. At this point, the timer has only counted 200. The timer must count an additional 100 (equivalent to 10 inches of conveyor travel) before relay 157 is actuated to initiate the next carriage cycle. Accordingly, 10 inches of dwell is thus introduced in the operation of the carriage 111 and the carriage will operate on a 30 inch cycle to produce pads 15 inches in length (both hoods being in use.

23 inch pad length cycle

To subdivide the batt strips into lengths longer than 20 inches, for example 23 inches, hood 105 is disabled by opening switches 146, 149. Only hood 104 is used for any pad length cycle greater than 20 inches. The circuit of timer 156 which triggers relay 157 is pre-set to count 230. Accordingly, there will be a 3 inch dwell at the end of every 20 inch basic cycle of the carriage 111 and the batt divider will operate on a 23 inch cycle.

In a commercial embodiment of the invention, any length of pad up to 12 feet (144 inches) can be fabricated simply by suitable setting of timer 156. For a 144 inch pad the timer circuit which triggers relay 157 is set to count 1440. Carriage 111 will then cycle through 20 inches of conveyor travel and will dwell for the remaining 124 inches of the cycle.

The variable length combination embosser-cut-off knife unit

Spaced a fixed distance from the batt divider unit 102 is the combination variable length embosser-cut-off-knife unit 166. As shown in FIGS. 12 and 13, the longitudinally subdivided strips of batt material 100 are fed from belt conveyor 101 onto belt conveyor 167 and between the upper and lower sheet strips 168, 169 of wrapping paper to the facing surfaces of which glue is applied, as in the embodiment shown in FIGS. 1 and 2. Wrapping paper sheets 168, 169 are drawn from supply rolls 171 rotatably supported on portable dollies 180. The supply rolls 171 are optionally driven and braked by the power driven belts 181.

The wrapping paper sheets 168, 169 are pressed together between the laterally spaced batt strips 100 by means of the presser wheels 172. The wrapping paper sheets are pressed and bonded to the batt strips 100 by the presser conveyor belt 173 (FIGS. 12 and 13). The laterally spaced pads may be slit by means of the slitter knives 174 and the resultant sleeves 184 of longitudinally spaced pad sections are still connected longitudinally across the gaps therebetween and are fed into the embosser-knife unit 166 by the paired conveyor belts 175.

The details of the embosser-knife unit 166 are best shown in FIGS. 17 through 19. There is a stationary frame 176 having outwardly facing guide tracks 177 between which the respective horizontally axled roller wheels 178 of the embosser carriage plate 179 ride. Rollers 178 of the carriage plate are mounted on fore and aft sets of blocks 182 also provided with vertically axled rollers 183 which bear laterally on lower track rail 177.

Carriage plate 179 is provided with a cam follower roller 185 engaged in a cam groove 186 formed in the surface of cam drum 187 having a profile substantially identical with that of cam drum 122 of the batt divider unit. The cam drum 187 has a shaft 188 on the end of which is a bevel gear 189 driven from the bevel gear 192 on shaft 193 which extends into the gear box 194 and is connected by shaft 195 to a combination electric brake 196 and electric clutch 191 and thence to an input shaft 197. The electromagnetic coupling 191, 196 has a function comparable to that of the electromagnetic coupling 130, 132 for the batt divider unit. Shaft 188 is also provided with cams 199, 202 which respectively actuate switches 203, 204 in the circuit shown in FIG. 20.

Carriage plate 179 carries two combination embosser and cut-off knife units 205, 206. While otherwise identical, embosser-knife unit 205 is mounted in relatively fixed position on carriage 179 and unit 206 is mounted for relative adjustment toward and away from unit 205. Each unit 205, 206 comprises a base plate 207 which carries on box channel legs 226 an anvil 208 which is slotted at 209 to receive between the portions of the anvil spaced by the slot a cut-off knife 210. Serrated cut-off knife 210 is supported on an overhead channel frame 213 which is mounted to reciprocate vertically as guided by the side flanges and web of the upright inwardly open end channels 214 within which rollers 215 extending laterally from the ends of the frame 213 are disposed. The frame 213 for unit 205 is connected to piston rods 216 of the pneumatic motor cylinders 217 and frame 213 for unit 206 is connected to piston rods 236 of pneumatic motor cylinders 235.

Also mounted on the respective cross frames 213 are paired embossing bars 218 spaced at opposite sides of the knife 210 and aligned vertically with anvil portions 208. The bars 218 are threaded to the ends of guide pins 219 which are slidable vertically in the top of frame 213 and are biased downwardly by the coil springs 222. Each knife 210 is fixedly mounted in its frame 213 approximately ½ inch above the sole plates of the bars 218.

Accordingly, when the air cylinders 217, 235 are actuated to draw the frames 213 downwardly, the embossing bars 218 will first press gap portions of the wrapped pad sleeves 184 against the anvils 208, thus to adhere the glue on the facing surfaces of the wrapping paper at opposite sides of the sleeves. Continued downward movement of the frame 213 will engage the knife 210 with the portion of wrapping paper held by the bars 218 between the two spaced anvils 208 to sever the sleeve 184 longitudinally across the gaps. The springs 222 will simply yield during the course of such continued movement of the knife 210. When the fluid motors 217, 235 are actuated to lift the frames 213, knife 210 will first retract upwardly while the bars 218 will hold the paper and thus serve to strip the paper from the knives. When the knife has been completely withdrawn, the heads 223 on the pins 219 will be engaged by the rising frame 213 to positively lift the bars 218 against the bias of springs 222 away from engagement with the paper.

During the embosser-knife cycle, drum cam 187 is moving the carriage 179 at the same velocity as the pad sleeves 184 and conveyor 224 so that there is no relative longitudinal movement between the pads and embosser-knife unit. As in the batt divider, the drum cam 187 and pneumatic motors 217, 235 comprise means for moving the embosser-knife units 205, 206 on orbital paths including paths of advance and retraction with respect to the pad sleeve 184 and paths of movement parallel to the pad sleeve 184.

The pads are carried through the embosser-knife unit on the endless multiple belt conveyor 224 which is threaded through appropriate openings 225 in the side frame members 226 which support the anvils 208. The upper runs of the belts 224 are guided on rollers 227 mounted on ears 228 extending upwardly from plate 207 and beneath idler roller 229 mounted between the channel flanges 226. The return or lowermost run of belts 224 also pass through openings 225 in plates 226, but beneath roller 229. Accordingly, even though the operating mechanism for channel frame 213 is on the opposite side of belts 224 from the frame 213, the belts 224 run freely and do not interfere with carriage reciprocation.

Embossing unit 206 is adjustable toward and away from embossing unit 205 and for this purpose, carriage plate 179 is longitudinally slotted along its margins at 232 and the plate 207 for the embossing unit 206 has downwardly projecting guide studs 233 projecting through the slots 232 and adjustably fastened thereto by lock nuts 234 (see FIG. 18). This structure is similar to that shown in FIG. 15 for the batt divider unit and permits adjustment of the embosser-knife unit 206 toward and away from embosser-knife unit 205. In the course of this adjustment the runs of belts 224 will simply run freely through openings 225 and around the rollers 227, 229.

The respective embosser-knife units 205, 206 are set for operation in much the same way as the respective hoods 104, 105 of the batt divider 102. For pad lengths 20 inches or more, manual switch 243 is opened to deactuate relays 239, 240 and set pneumatic valves 200, 201 to energize fluid motors 235 to disable the embossing bars and knife of unit 206. Accordingly, only relays 237, 238 which operate pneumatic valves 211, 212 for fluid motors 217 of unit 205 remain in circuit with cam operated switches 203, 204. One switch 203 is closed at the beginning of the cycle of carriage 179.

Cam 202 will operate in timed sequence with the operation of the batt divider unit as controlled by the timer 156, as hereinafter explained. In the first inch of carriage travel, cam 202 will close switch 204 to complete the circuit to relays 237, 238, energize pneumatic motors 217 and lower the embosser bar and knife unit 205 onto the pad sleeve 184 while accelerating from a standing start. In the next 8 inches of travel, the bar will be traveling at the same velocity as the pad sleeve and the knife and embossing bars will function as aforestated. In the last inch of carriage travel cam 199 will open switch 203 to break the circuit to relays 237, 238 and shift valves 211, 212 to raise the knife and embosser unit away from contact with the pad sleeve. The carriage will decelerate to a complete stop, whereafter the carriage will be reversed to the beginning of the cycle. For pad lengths less than 20 inches, switch 243 will be closed and all four relays 237–240 will be in circuit with the switches 203, 204. Carriage 179 is provided with a limit switch 250 in the circuit of FIG. 20. Switch 250 performs for the embosser-knife unit the same functions as switch 154 performs for the batt divider unit.

From the foregoing, it is clear that the spacing between the respective knife-embosser units 205, 206 will be pre-set to be the same as in the case of the vacuum hoods 104, 105 of the batt divider unit 102. Accordingly, both units 102, 166, when triggered in proper sequence by the timer 156, will register at the same spacing with the gaps in the pad sleeves 184 and the batt strips 100.

Only if the spacing between the batt divider 102 and embosser-knife unit 166 is a whole number multiple of the number of pads therebetween can the movements of respective carriages 111 and 179 be initiated simultaneously. Where the spacing between the batt divider 102 and embosser-knife unit 166 includes a fractional multiple of the number of pads therebetween simultaneous initiation of the cycles of carriages 111, 179 would result in non-registration of the embosser-knife units 205, 206 with the gaps between pads in sleeves 184. In the device of the present invention, timer 156 justifies the cycle of carriage 179 with the cycle of carriage 111 for accurate registration of the embosser-knife units 205, 206 with the gaps between pads in sleeves 184 regardless of pad length.

The control panel of timer 156 consists of four glow-transfer counting tubes 245 which electrically perform four-digit counting. These tubes are arranged on a horizontal row "A" on the panel shown in FIG. 24.

Arranged in a second row "B" are four manually set dials 246 which are pre-set to give the desired count for signalling the relay 157 in the circuit to the batt divider unit 102. The third horizontal row "C" consists of four manually set dials 247 which are pre-set to give the desired count to signal or trigger the relay 248 for switch 249 in the circuit to the clutch 191 and brake 196 which control operation of the carriage 179 of the embosser-knife unit 166. The dials 247 are set to delay the initiation of the cycle of carriage 179 for a time interval necessary for the fractional part of a pad to pass beneath the knife-embosser bars and then trigger the cycle of carriage 179 to operate it in step with the gaps between pads.

Following is a partial chart for pad lengths from 20–30 inches useful to compute the dial settings for row "C," depending upon the pad length.

| Pad Length (Inches) | Formula | Delay (Inches) |
|---|---|---|
| 20 | R=120/20=Even number | 0. |
| 21 to 23 | $R = \left(\dfrac{120}{x} - 5\right)(X)$ | 21 Inch=15. 22 Inch=10. 23 Inch=5. |
| 24 | R=120/24=Even number | 0. |
| 25 to 29 | $R = \left(\dfrac{120}{x} - 4\right)(X)$ | 25 Inch=20. 26 Inch=16. |
| 30 | R=120/30=Even number | 0. |

R=Delay (inches).
X=Pad length (inches).

It is seen that whenever the formula for the time delay results in an even number, time delay is zero and the time dials 247 will be set for zero. However, when the number is not even, but includes a fraction, dials 247 must be set to introduce time delay between and justify the cycles of carriages 111 and 179.

The above chart is based upon an assumed 120 inch spacing between the respective units. For example, if it is desired to fabricate pads which are 22 inches long, the number of 22 inch pads between the batt divider and the knife-embosser unit equals $120/22 = 5^{10}/_{22}$ pads. Accordingly, the firing of the knife embosser unit must be delayed $10/22$ of a pad length or $10/22 \times 22 = 10''$ of conveyor travel relative to the firing of the batt divider unit to accomplish justification. Accordingly, dials 247 are set for 100 ($10'' \times 10$ impulses per inch=100). Accordingly, the knife-embosser unit will be fired at a point in time which is 100 pulses after the batt divider unit has been fired and the cycles of the two units will be justified for a 22" pad length.

If a 30" pad length is to be fabricated reference to the chart shows that R equals an even number and hence, there is no need for delaying the firing of the knife-embosser unit. Dials 247 are accordingly set for zero, and the batt divider and knife-embosser will be fired concurrently.

Dials 246, of course, are adjusted to fire the batt divider unit to accommodate for the particular length of pad that is to be fabricated. The batt divider unit is the primary unit which is the reference point for the functioning of the knife-embosser unit. The embosser-knife unit is synchronized in relation to the batt divider unit.

For pad lengths of 10 inches through 19 inches, the control dials 247 are set for double the actual length, inasmuch as for this range of pad lengths, it is necessary to use two hoods of the batt divider and two bars of the embosser unit. Two pads are thus produced in each cycle and the control dials are set accordingly.

By way of further example, the determination of the setting of dials 247 will now be explained, assuming a 16 inch pad. The respective hoods and bar units of the divider 102 and knife-embosser 166 are set at 16 inch spacings. Accordingly, if the batt divider unit is triggered at time intervals equivalent to 32 inches of batt travel, gaps will be removed from the batt strips at 16 inch spacings. Inasmuch as the basic carriage cycle is 20 inches, 12 inches of dwell must be incorporated for each 10 inch cycle. Accordingly, the dials 246 in row "B" of the timer panel 156 are set at 320 (there being 10 impulses per inch of conveyor movement). As aforestated, 200 impulses are used to cycle the carriage 111 once, and the remaining 120 impulses delay the next cycle for 12 inches of batt strip travel. For a 16 inch pad length there will be $7^{5}/_{16}$ pads between the batt divider and the knife-embosser unit. Inasmuch as dials 247 are set for double the actual fractional length of the odd pad, a 16 inch delay is required and dials 247 are set for 160.

By way of further example, if pads 23 inches in length are to be fabricated, dials 246 would be set at 230 and only one hood and embossing unit would be used with a 3 inch dwell between each cycle of carriage 111. From the chart above, we find that for a 23 inch cycle, a time delay of 5 inches is required for justifying the cycle of carriage 179 with carriage 111. Accordingly, dials 247 are set for 50.

The apparatus shown in FIGS. 25 through 29 is adapted to divide from a continuous batt 260 circular segments 261 which are ensleeved between upper and lower wrapping webs 262, 263 which are subsequently sealed around the segments and cut from the webs and delivered onto the conveyor 264 as discrete circular pads 265. As in the apparatus previously described, the batt 260 is formed on a conveyor screen 266 from which it is delivered onto a conveyor belt 267 and passes beneath a compressing belt 268. Batt divider apparatus very similar to apparatus 102 is positioned over the belt 267. The only difference is in the configuration of the air channelling hood.

Instead of two separate hoods 104, 105, as shown in FIGS. 12 and 15, a single hood 271 is used. In practice the hoods 104, 105 are simply removed from the piston rods 142, 153 of the batt divider unit 102, and the single hood 271 substituted. The switches 146, 149 of the circuit shown in FIG. 20 are closed for concurrent energization of all pneumatic motors and all blowers.

Hood 271 is suspended by piston rods 142, 143 from carriage plate 111 on a framework which includes cross pieces 272, 273, 274, 275 and side pieces 276, 278 (FIG. 26). I may additionally provide transverse cross pieces 281, 282 to help brace the hood structure laterally.

The hood is closed at its top by plates 283, 284 but is open at its top between the cross members 273, 274. Plates 283, 384 are provided with rectangular air intake openings at 285, 286.

Fastened by means of angle brackets 287 to the cross pieces 273, 274 is an annular partition 288 which defines the circular shape of the batt segment 261 to be divided from the batt 260.

The hood 271 will be raised and lowered from contact with the batt 260 in the manner hereinbefore described in connection with batt divider unit 102. Air and entrained batt material is withdrawn from all four conduits 291 of the batt divider unit 271. The air enters the hoods through the open top thereof between the cross bars 273, 274 and through the openings 285, 286 in the plates 283, 284. The air openings 285, 286 are strategically located at transition points within the hood to assume complete evacuation from the hood of all batt material outside partition 288. Batt material confined within the circular partition 288 will remain undisturbed. When the hood 271 is raised after having completed the evacuation of all batt material from around annular partitions 288, a circular batt segment or disk 261 will be left on the conveyor belt 267 to be conveyed in due course to the next belt conveyor 292 where it is ensleeved between upper and lower wrapping webs 262, 263 as aforestated. The rollers 172 shown in FIG. 12 are omitted from the FIG. 25 construction and the ensleeved pads 261 are compressed by the overhead belt 293 and are fed on belt conveyor 313 to the embosser-knife unit 294.

By way of example and not of limitation, the partition 288 may be 18 inches in diameter and round or circular pads 18 inches in diameter will thus be divided from the batt 260. The hood 271 may be 23 inches wide and the pads will be located on 22 inch centers on conveyor 267. In the structure aforesaid, the timer 156 will be set for a 22 inch cycle. Accordingly, there will be a one-inch overlap between successive hood positions as the hood periodically engages the batt 261 in the course of its cyclic movement.

The embosser-knife unit 294 is fundamentally similar to unit 166 shown in FIGS. 13 and 17 through 19, except that for the separate and selectively independently operated rectilinear embosser-knife components of unit 166, a circular embosser-knife unit is substituted. The respective pairs of piston rods 216, 236 carry cross H-channel-shaped members 295 which carry a top plate 296 to which the circular embosser-knife unit components are affixed. Generally, annular knife blade 311 is anchored to the bottom surface of plate 296 by a wooden ring 304 which is fastened to the plate 296 by an annular series of bolts 309. Blade 311 is serpentine or wavy in plan to improve its slicing action through the wrapping paper gaps between ensleeved pads 261. In practice the blade 311 is simply driven into the wooden ring block 304. At both sides of the knife blade 311 circular embossing bars 297, 298 respectively mounted on pairs of guide pins 303 and pairs of springs 301 may move vertically. Pins 303 are comparable to the pins 219 of the embodiment shown in FIGS. 17 through 19 and the springs 301 are comparable to the springs 122 thereof. As shown in FIG. 27, the facing surfaces of bars 297, 298 are contoured to intermesh with the serpentine side walls of blade 311.

Springs 301 project through suitable apertures 306 formed in the wooden blade mounting rings 304, 305 and are seated in pockets 307 formed in the upper surfaces of the bars 297, 298.

The lower surfaces of bars 297, 298 are desirably faced with a rubber strip 305 for non-skid clamping action on the wrapper webs 262, 263.

In practice, and to adapt the machine to incorporate the circular embosser-knife unit 294, the cross bars 205, 206 of the embodiment of FIG. 17 are simply removed, the air cylinder pistons 216, 236 adjusted to a 15 inch spacing on the carriage plate 179, and the cross bars 295 attached to the piston rods. To the bottom embossing bars 208 of the device shown in FIGS. 17 through 19 is mounted a base plate 312 which is also provided with a scalloped or serpentine kerf 313 to receive the cutting edge of knife 311. Plate 312 is above the level of the upper run of the multiple belt conveyor 313 and may be provided with aprons 314, 315 to lead the ensleeved pads 261 onto the base plate 312 and off the base plate 312 after the embosser-knife unit has completed its cycle.

Cam 187 is driven from shaft 193 in the same manner as hereinbefore described and the pneumatic motors 217, 235 will function concurrently, switch 243 of the circuit shown in FIG. 20 being closed for this purpose. Timer 156 is set for a 22 inch cycle and dials 247 are set to synchronize or justify the cycling of unit 294 with the cycling of the batt divider 271. The circular embossing bars will seal the wrapping paper around the circular batt segments 261 and knife 311 will concurrently sever the round pad 265 from the waste.

Belt conveyor 313 is trained over end roller 316 and tensioning roller 317. The waste from about the cut pads 265 is drawn downwardly about the roller 316 by cooperating rollers 318, 319 and may be returned to the hammer mill which supplies the volumetric feeder 14. Because of its greater thickness and stiffness, the severed pad 265 will tend to peel from the surrounding waste as the waste follows the contour of roller 316 and will project itself tangentially from rollers 316 to be picked up on the conveyor 264 for removal from the apparatus.

In a broad sense, the apparatus and method herein disclosed is not limited to treatment of a batt strip for production of pads. Any elongated workpiece carried by a conveyor moving at a predetermined velocity can be treated by workpiece treating elements moved in cycle of periodic engagement with the workpiece and timed in relation to the velocity of the conveyor to treat the workpiece at predetermined intervals. However, the invention has particular utility in the environment and for the purposes for which it is adapted in the disclosed embodiments thereof.

I claim:
1. A method of severing a batt of non-self-sustaining loosely compacted fibers and comprising the steps of enclosing an area of desired batt severance and flowing a fluid stream in a confined channel against said batt in the enclosed area of desired batt severance to sever by convection the batt material in said area from batt material outside said area and to remove by convection batt material from the area thus enclosed.

2. A method of dividing an elongated strip of non-self-sustaining loosely compacted fibrous batt material into discrete portions and comprising the steps of enclosing areas of desired batt severance and flowing a fluid stream in a confined channel against the batt strip in said enclosed areas to sever by convection the batt material in said area from batt material outside said area and to remove by convection batt material.

3. The method of claim 2 in which said fluid flow is induced by exposing said batt material to vacuum.

4. The method of claim 2 in which said fluid flow is induced by exposing said batt material to an air nozzle.

5. The method of claim 2 plus the step of advancing the batt strip in the direction of its elongation past the inlet to a vacuum duct.

6. The method of claim 5 plus the step of directing a stream of air or the like against said batt strip at its side opposite said inlet.

7. The method of claim 6 in which the stream of air is directed laterally across the batt strip.

8. A method of preparing pads comprising the steps of advancing a strip of batt material, removing by convection in a stream of air or the like segments of batt material from the strip at points spaced longitudinally thereof to divide the strip into discrete sections spaced by gaps from which said batt material segments have been removed, ensleeving said spaced discrete batt sections and intervening gaps in a continuous sleeve wrapper, sealing together wrapper portions opposite said gaps to close the wrapper portions confining said batt sections and severing said wrapper through said seals to form discrete wrapped batt pads.

9. The method of claim 8 in which the wrapper is severed through said seals by tearing the seals in a jagged pattern to fray out the fibers of the wrapper.

10. The method of claim 8 plus the intermediate step of applying to the face of said wrapper intended for contact with said batt material an adhesive characterized by pliability after setting.

11. Apparatus for severing non-self-supporting loosely compacted fibrous batt material into discrete spaced strip portions and comprising enclosure means for enclosing a segment of batt material, means for establishing within the enclosure means a confined convection stream of air or the like and means to support said batt material with a segment thereof within said enclosure means and in confined exposure to said stream for the severance by convection of said segment from batt material outside said enclosure means and removal by convection of the segment of batt material thus exposed.

12. Apparatus for dividing an elongated strip of non-self-supporting loosely compacted fibrous batt material into discrete spaced portions and comprising an enclosure for a segment of batt material, first means for establishing a confined convection stream of air or the like within said enclosure and second means for supporting said strip with a segment thereof within said enclosure and in confined exposure to said first means for the severance by convection of said segment from batt material outside said enclosure means and removal by convection of the segment of batt material thus enclosed.

13. The device of claim 12 in which said second means for supporting said strip comprises a conveyor for advancing the strip in the direction of its elongation past said first means and means for periodically activating said first means to remove batt material from the segment of the strip opposite the first means.

14. The device of claim 12 in which said second means for supporting said strip comprises a conveyor for advancing the strip in the direction of its elongation past said first means, said enclosure comprising an air hood and carrier means for disposing said hood upon said segment to at least partially enclose said segment when it is exposed to said first means.

15. Apparatus for dividing an elongated strip of batt material into discrete spaced sections and comprising a conveyor on which the strip is advanced in the direction of its elongation, means adjacent said conveyor for establishing a convection current against a portion of batt material at the point of desired spacing for removal by convection of a segment of batt material from said strip to divide the strip into discrete portions spaced by gaps from which said segment has been removed, means for further advancing the longitudinally spaced strip sections, means for ensleeving about said longitudinally spaced sections and the gaps therebetween a continuous wrapper, means for sealing together wrapper portions at opposite sides of said gaps and means for severing said wrapper portions through said seals to form discrete wrapped pads.

16. Apparatus for dividing an elongated strip of non-self-supporting loosely compacted fibrous batt material into discrete spaced strip portions and comprising a conveyor for advancing said strip in the direction of its elongation, relatively stationary means past which the conveyor travels for establishing a convection current to remove a segment of batt material from that portion of the strip in the path of said current, a hood enclosure having means for advancing it in step with said conveyor and for positioning it over said strip segment whereby to channel said convection current.

17. The device of claim 16 in which the means to establish the convection current comprises a vacuum duct having an inlet port exposed to said batt strip, said hood enclosure having means substantially sealing said hood against said batt strip and means for evacuating said duct when said hood and the batt segment sealed thereby are adjacent said inlet port.

18. Apparatus for dividing an elongated strip of non-self-supporting loosely compacted fibrous batt material into discrete spaced strip portions and comprising a conveyor for advancing said strip in the direction of its elongation, means past which the conveyor travels for establishing a convection current to remove a segment of batt material from that portion of the strip in the path of said current, a hood enclosure having means for advancing it in step with said conveyor and for positioning it over said strip segment whereby to channel said convection current, the means to establish the convection current comprising a vacuum duct having an inlet port exposed to said batt strip, said hood enclosure having means substantially sealing said hood against said batt strip and means for evacuating said duct when said hood and the batt segment sealed thereby are adjacent said inlet port, said vacuum duct inlet port being offset laterally from the path of batt strip travel, said means to establish the convection current further comprising a source of pressurized air or the like and having a nozzle at the side of the strip opposite the port and directed laterally across the strip and into said hood whereby the convection current is induced in a direction laterally of the movement of the conveyor.

19. Apparatus for preparing wrapped pads of batt material and comprising a conveyor on which an elongated strip of batt material is carried, means past which said conveyor moves for periodically removing by convection segments of batt material from the strip at points spaced longitudinally thereof to divide the strip into discrete sections spaced by gaps from which said batt material segments have been removed, means for ensleeving the spaced discrete portions and intervening gaps in a continuous sleeve wrapper, means for sealing together wrapper portions at opposite sides of said gaps and a cut-off knife for severing said wrapper through said seals to divide the wrapped strip into discrete wrapped pads.

20. A method of dividing an elongated strip of batt material into discrete portions and comprising the step of flowing a fluid stream against the batt strip at desired points of severance thereof to remove by convection batt material therefrom and concurrently advancing the batt strip and the said fluid stream in the direction of batt strip elongation.

21. The method of claim 20 plus the further step of channelling the fluid stream in a hood and moving the hood in a cyclic path of periodic engagement with the batt strip.

22. The method of claim 21 plus the further step of flowing another fluid stream against the batt strip at a longitudinally spaced point of desired batt severance, channelling the said other stream in another hood and moving said other hood on a complementary cyclic path on which the other hood engages the batt strip at said longitudinally spaced point.

23. The method of sealing a pad wrapper between spaced pad batt sections in a continuous elongated sleeve having spacing gaps intervening between pads, said method comprising the steps of moving the sleeve in the direction of its elongation, moving sleeve gap sealing means in timed coordination with sleeve movement and on a cyclic path of periodic engagement with sleeve portions across said gaps to seal together the sleeve portions across said gaps, plus the further step of severing said sleeve across sealed sleeve portions held by said sealing means during the course of concurrent movement of the sealing means with said sleeve, plus the further step of moving a second sleeve gap sealing means in timed coordination with the movement of the pad sleeve and the cyclic movement of the sleeve gap sealing means first mentioned and on a complementary cyclic path, said cyclic paths being spaced longitudinally of the sleeve a distance equal to the spacing of the gaps within said sleeve.

24. A method of preparing wrapped pads from an elongated batt strip and comprising the steps of advancing a strip of batt material in the direction of its elongation, moving batt divider means for subdividing the batt into batt segments spaced by dividing gaps on a cyclic path of periodic engagement with the moving batt strip to divide the strip into discrete batt segments spaced by gaps, ensleeving said spaced discrete batt segments and intervening gaps in a continuous sleeve wrapper, cyclically moving sleeve gap sealing means in timed coordination with the cyclic movement of said batt divider means and on a path of periodic engagement with sleeve wrapper portions across said gaps whereby to seal together said sleeve wrapper portions, and severing said wrapper through said seals to form discrete wrapped batt pads.

25. The method of claim 24 plus the step of justifying the cyclic movement of said sleeve gap sealing means with the cyclic movement of said batt divider, whereby said sealing means will seal said wrapper in registry with said gaps regardless of the spacing between the batt dividing means and sealing means and regardless of pad length.

26. The method of claim 24 in which said batt divider comprises a hood through which a fluid stream removes by convection batt material confined within said hood.

27. Apparatus for dividing an elongated strip of batt material into discrete spaced segments and comprising means for flowing a fluid stream against the batt strip at desired points of batt severance thereof to remove by convection batt material therefrom and means for concurrently advancing the batt strip and the said fluid stream in the direction of batt strip elongation.

28. The device of claim 27 in which the means for flowing the fluid stream against the batt strip comprises a hood, the means for advancing the fluid stream comprising means for moving the hood in a cyclic path of periodic engagement with the batt strip.

29. The device of claim 28 in which the means last mentioned includes means for changing the period of the cycle for changing the length of segments divided from the strip.

30. The device of claim 28 in which the hood has a circular partition for forming circular batt segments.

31. The device of claim 28 in which the means last mentioned comprises a carriage, means for reciprocating the carriage on a path parallel to the path of batt strip movement, means mounting the hood on the carriage and on which the hood is powered to retract and advance with respect to said carriage, and means timed with batt strip movement for actuating the carriage reciprocating means and the hood advancing and retracting means in timed relation to batt strip movement.

32. The device of claim 31 in further combination with means for changing the period of the cycle for changing the length of segments divided from the strip.

33. The device of claim 31 in which the means for reciprocating the carriage comprises a cam drum and the means for advancing and retracting the hood comprises fluid motors.

34. Apparatus for dividing an elongated strip of batt material into discrete spaced segments and comprising means for flowing a fluid stream against the batt strip at desired points of batt severance thereof to remove by convection batt material therefrom and means for concurrently advancing the batt strip and the said fluid stream in the direction of batt strip elongation, the means for flowing the fluid stream against the batt strip comprising a hood, the means for advancing the fluid stream comprising means for moving the hood in a cyclic path of periodic engagement with the batt strip, in further combination with a second hood, and means for moving the second hood on a cyclic path complementary to the cyclic path of the first hood for periodic engagement of said hoods with the strip at points spaced a distance equal to gap spacing.

35. The device of claim 34 in which the means for cyclically moving the hoods comprises a carriage, and means for relatively adjustably spacing the hoods on said carriage for changing the length of batt segments divided by the hoods.

36. Apparatus for fabricating pads and comprising a conveyor for moving an elongated strip of batt material in the direction of its elongation, batt dividing means adjacent said conveyor for removal of a segment of batt material from said strip to divide the strip into discrete portions spaced by gaps from which said segments have been removed, means for moving said batt divider means on a cyclic path of periodic engagement with said batt strip, means for ensleeving a continuous wrapper about said longitudinally spaced batt sections and the gaps therebetween, means for sealing together wrapper portions across said gaps including means for moving said sealing means on a cyclic path in timed coordination with the cyclic path of the batt divider means.

37. The device of claim 36 in which the means for timed coordination of the cyclic movement of the batt divider and sealing means includes means for justifying said cyclic movements whereby the sealing means will coact with the wrapper sleeve in registry with the gaps regardless of the spacing between the batt divider and sealing means and regardless of the length of the batt segments.

38. Apparatus for fabricating pads of selectively different length and comprising a conveyor upon which a batt strip is moved at a predetermined velocity, a batt divider unit disposed adjacent said conveyor and constituting means for removing batt sections from said strip to leave gaps between remaining portions of said strips, means for moving said batt divider in a cyclic path of periodic engagement with said batt strip and means for selectively changing the time cycle of said cyclic path with respect to velocity of said conveyor, to selectively change the spacing between the gaps formed by the divider.

39. The device of claim 38 in which the means for moving said divider in its cyclic path comprises a carriage mounted in spaced relation to the conveyor, means for reciprocating said carriage on a path substantially parallel to the path of conveyor movement, means for mounting said batt divider on said carriage and including means for advancing and retracting said batt divider toward and away from said conveyor.

40. The device of claim 39 in which the means for timing the divider unit comprises means for operating said carriage through total cycle comprising a portion of substantially fixed period and means for introducing dwell between the termination of said period and the initiation of the next period.

41. Apparatus for fabricating pads of selectively different length and comprising a conveyor upon which a batt strip is moved at a predetermined velocity, a batt divider unit disposed adjacent said conveyor and constituting means for removing batt sections from said strip to leave gaps between remaining portions of said strips, means for moving said batt divider in a cyclic path of periodic engagement with said batt strip and means for selectively changing the time cycle of said cyclic path with respect to velocity of said conveyor, to selectively change the spacing between the gaps formed by the divider, the means for moving said divider in its cyclic path comprising a carriage mounted in spaced relation to the conveyor, means for reciprocating said carriage on a path substantially parallel to the path of conveyor movement, means for mounting said batt divider on said carriage and including means for advancing and retracting said batt divider toward and away from said conveyor, the means for timing the divider unit comprising means for operating said carriage through total cycle comprising a portion of substantially fixed period and means for introducing dwell between the termination of said period and the initiation of the next period, in further combination with means for ensleeving with wrapping paper the space discrete batt segments formed by the batt divider and the intervening gaps therebetween, means for sealing the wrapping paper across said gaps and comprising an embossing bar and means to move said embossing bar through an orbital cycle of periodic engagement with the sleeve in timed coordination with the cycle of the batt divider whereby said bar will register with said gaps.

42. The device of claim 41 in which said bar is rectilinear.

43. The device of claim 41 in which said bar is annular.

44. The device of claim 41 in which said means last mentioned comprises a carriage in spaced relation to said conveyor, means for reciprocating the carriage on a path parallel to said bar, means for advancing and retracting said bar transversely to carriage reciprocation, said timing means including means for justifying the orbital cycle of said bar to the cycle of said batt divider.

45. The device of claim 44 in which said batt divider comprises a hood, and means for flowing a fluid stream through said hood to remove by convection batt portions from said strip.

46. The device of claim 45 in which said conveyor has a driving mechanism, the respective means for reciprocating said carriages comprising electromagnetic couplings, and means for periodically energizing said couplings in response to said timing means.

47. In a device of the character described and including a conveyor on which elongated batt strip is carried, a batt divider unit adjacent said conveyor and means to move said batt divider in a cycle of periodic engagement with the batt strip, timing means for energizing said means for moving said divider in its cyclic path and comprising counting means responsive to the velocity of conveyor movement and apparatus responsive to said count for signalling said cycling means to initiate its cycle, and means for changing the count of said counting means to change the length of the batt segment divided by the batt divider.

48. The device of claim 47 in which said means for moving the divider in its cyclic path has a portion of fixed period, said counting means comprising means for introducing dwell at the termination of said portion and prior to the initiation of the next cycle.

49. The device of claim 48 in further combination with means for ensleeving with wrapping paper batt segments subdivided from said strip, sealing means spaced from said batt divider and having means for moving it on a cyclic path with respect to said conveyor for sealing together wrapping paper across gaps between said batt segments, and means for justifying the cycle of the sealing means with the cycle of the batt divider.

50. In a device of the character described and including a conveyor on which an elongated workpiece is conveyed at a predetermined velocity, workpiece treating apparatus adjacent said conveyor and including a workpiece treating element, means to move said workpiece treating element in a cycle of periodic engagement with the workpiece, and means for timing said cycle for treatment of said workpiece at predetermined intervals, in further combination with means for selectively changing the said cycle to change the intervals at which said member engages the workpiece.

51. The device of claim 50 in which said element has a cycle with a portion of fixed period, said timing means comprising means for introducing dwell at the termination of said period and before the initiation of the next cycle.

52. In a device of the character described and including a conveyor on which an elongated workpiece is conveyed at a predetermined velocity, workpiece treating apparatus adjacent said conveyor and including a workpiece treating element, means to move said workpiece treating element in a cycle of periodic engagement with the workpiece, and means for timing said cycle for treatment of said workpiece at predetermined intervals, said workpiece comprising a strip of batt material and said element comprising a hood and means for flowing a fluid stream through said hood to remove by convection batt material segments confined within said hood.

53. The device of claim 50 in which said workpiece comprises a continuous sleeve with spaced sleeve contents and periodic gaps intervening between said contents, said element comprising a combined embossing bar and severing knife for sealing said sleeve across said gaps and severing said sleeve through the sealed sleeve portions.

54. The device of claim 50 in which the means to move the element in its cycle comprises a carriage, means to reciprocate the carriage on a path generally parallel to the path of workpiece travel, means for mounting said element on said carriage for movement transversely to the direction of workpiece travel and to and from engagement with said workpiece.

55. The device of claim 54 in which the means for reciprocating the carriage comprises a cam, said carriage having a cam follower engaged with said cam.

56. In a device of the character described and including a conveyor on which an elongated workpiece is conveyed at a predetermined velocity, workpiece treating apparatus adjacent said conveyor and including a workpiece treating element, means including a carriage to move said workpiece treating element in a cycle of periodic engagement with the workpiece, and means for timing said cycle for treatment of said workpiece at predetermined intervals, in further combination with a second workpiece treating element and means including said carriage for moving said second element in a complementary cycle of periodic engagement with said workpiece in which said first and second elements engage said workpiece at predetermined spaced intervals along the workpiece, in further combination with means to adjust the spacing along said carriage between said elements.

57. The device of claim 56 in further combination with means for immobilizing one of said elements whereby only one of said elements cycles periodically.

58. A method of forming pads from a batt strip and comprising the steps of mounting a batt strip divider unit at a fixed spacing from a sleeve gap sealing unit, feeding a batt strip from said batt divider unit to the sleeve gap sealing unit, moving the batt divider unit and the sleeve gap sealing unit in complementary cyclic paths of periodic engagement with the batt strip, measuring the number of pads divided from the strip by the batt divider unit and which intervene between said units and justifying the cycle of the sleeve gap sealing unit with the cycle of the batt divider unit for registration of the sleeve gap sealing unit with gaps formed in the strip by the batt divider unit by delaying the initiation of the cycle of the sleeve gap sealing unit in an amount corresponding to any fractional part of a pad length intervening between said units.

59. Apparatus for dividing an elongated strip of batt material into discrete spaced circular segments and comprising a hood having a circular partition defining a protected zone within the hood, means for flowing a fluid stream through portions of the hood outside the protected zone defined by said partition, a conveyor for advancing the batt strip in the direction of its elongation and means for moving the hood in a cyclic path of periodic engagement with the batt strip.

60. The device of claim 59 in further combination with means for ensleeving a continuous wrapper about the spaced circular batt segments and the gaps therebetween, circular sealing means spaced from said hood, means for moving said circular sealing means on a cyclic path of periodic engagement with the batt strip and across the gaps therebetween and in timed coordination with batt strip movement.

61. The device of claim 60 in which said sealing means comprises radially spaced inner and outer circular embossing bars, a circular knife in the space between said bars and means for sequentially engaging said bars with said wrapper for sealing the wrapper about said circular batt segment and engaging the knife with the said seal for severing the wrapper across said seals.

62. The device of claim 61 in which said knife is serpentine in plan.

63. A hood for the pneumatic removal of batt material from an elongated strip of such material and comprising a substantially rectangular outermost housing, a substantially circular innermost partition, and fluid inlet and exhaust connections to the space between said housing and partition for removal of batt material from said space.

64. A combination embossed-knife unit for sealing and severing circular pads ensleeved in continuous wrapping webs and comprising concentric annular embossing rings, means for concurrently advancing and retracting said rings with respect to said ensleeved pads, a generally circular cut-off knife between said rings and movable with respect thereto for severing webs sealed by said rings.

65. The device of claim 64 in which said knife is serpentine in plan, said rings having adjacent surfaces correspondingly contoured to mesh with said knife.

References Cited in the file of this patent

UNITED STATES PATENTS 2,824,610     Schubert et al. _____ Feb. 25, 1958